US011790062B2

(12) United States Patent
Toth et al.

(10) Patent No.: US 11,790,062 B2
(45) Date of Patent: *Oct. 17, 2023

(54) PROCESSING AUTHENTICATION REQUESTS TO SECURED INFORMATION SYSTEMS BASED ON MACHINE-LEARNED USER BEHAVIOR PROFILES

(71) Applicant: Bank of America Corporation, Charlotte, NC (US)

(72) Inventors: Michael E. Toth, Charlotte, NC (US); Hitesh Shah, Seattle, WA (US); Xianhong Zhang, Seattle, WA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/498,317

(22) Filed: Oct. 11, 2021

(65) Prior Publication Data

US 2022/0027441 A1 Jan. 27, 2022

Related U.S. Application Data

(63) Continuation of application No. 16/210,010, filed on Dec. 5, 2018, now Pat. No. 11,176,230.

(51) Int. Cl.
*G06F 21/31* (2013.01)
*G06F 21/62* (2013.01)
(Continued)

(52) U.S. Cl.
CPC ........ *G06F 21/316* (2013.01); *G06F 21/6218* (2013.01); *G06N 20/00* (2019.01);
(Continued)

(58) Field of Classification Search
CPC ............... G06F 21/316; G06F 21/6218; G06F 2221/2141; G06F 21/31; G06F 21/62;
(Continued)

(56) References Cited

U.S. PATENT DOCUMENTS

| 3,581,414 A | 6/1971 | Crawford |
| 7,647,645 B2 | 1/2010 | Edeki et al. |

(Continued)

OTHER PUBLICATIONS

"Baseline Information Security Standard," University of Colorado Office of Information Security, revised Sep. 12, 2013, retrieved from https://www.cu.edu/ security/system-wide-baseline-security-standards, 28 pages.

(Continued)

*Primary Examiner* — Quazi Farooqui
(74) *Attorney, Agent, or Firm* — Banner & Witcoff, Ltd.

(57) ABSTRACT

Aspects of the disclosure relate to processing authentication requests to secured information systems based on machine-learned user behavior profiles. A computing platform may receive an authentication request corresponding to a request for a user of a client computing device to access one or more secured information resources associated with a user account. The computing platform may capture behavioral parameters associated with the client computing device and may evaluate the behavioral parameters using a behavioral profile associated with the user account to determine a behavioral deviation score. Based on the behavioral deviation score, the computing platform may select an authentication action from a plurality of pre-defined authentication actions. Subsequently, the computing platform may generate commands directing an account portal computing platform to allow access, conditionally allow access, or prevent access based on the selected authentication action. Then, the computing platform may send the commands to the account portal computing platform.

20 Claims, 11 Drawing Sheets

(51) Int. Cl.
*G06N 20/00* (2019.01)
*H04L 67/306* (2022.01)
*H04L 67/50* (2022.01)

(52) U.S. Cl.
CPC .......... *H04L 67/306* (2013.01); *H04L 67/535* (2022.05); *G06F 2221/2141* (2013.01)

(58) Field of Classification Search
CPC ....... H04L 67/22; H04L 67/306; H04L 29/08; G06N 20/00
See application file for complete search history.

(56) References Cited

U.S. PATENT DOCUMENTS

| | | |
|---|---|---|
| 8,079,079 B2 | 12/2011 | Zhang et al. |
| 8,346,929 B1 | 1/2013 | Lai |
| 8,509,431 B2 | 8/2013 | Schmidt et al. |
| 8,533,803 B2 | 9/2013 | Cha et al. |
| 8,544,072 B1 | 9/2013 | Masone et al. |
| 8,627,438 B1 | 1/2014 | Bhimanaik |
| 8,677,451 B1 | 3/2014 | Bhimaraju et al. |
| 9,203,829 B1 | 12/2015 | Levine et al. |
| 9,396,332 B2 | 7/2016 | Abrams et al. |
| 9,397,990 B1 | 7/2016 | Taly et al. |
| 9,503,452 B1 | 11/2016 | Kumar et al. |
| 9,509,688 B1 | 11/2016 | Magi Shaashua et al. |
| 9,536,072 B2 | 1/2017 | Guedalia et al. |
| 9,628,491 B1 | 4/2017 | Jerrard-Dunne |
| 9,635,027 B1 | 4/2017 | Luzader |
| 9,692,740 B2 | 6/2017 | Hitchcock et al. |
| 10,069,842 B1 | 9/2018 | Bradley et al. |
| 10,205,717 B1 | 2/2019 | Shah et al. |
| 10,292,051 B2 | 5/2019 | Kusens et al. |
| 10,333,927 B2 | 6/2019 | Hinton et al. |
| 10,601,808 B1 | 3/2020 | Nijim et al. |
| 10,771,471 B2* | 9/2020 | Enqvist ................. H04L 63/102 |
| 10,965,683 B1 | 3/2021 | Castonguay et al. |
| 11,159,510 B2 | 10/2021 | Shah |
| 2003/0177121 A1 | 9/2003 | Moona et al. |
| 2004/0181670 A1 | 9/2004 | Thune et al. |
| 2006/0064502 A1 | 3/2006 | Nagarajayya |
| 2006/0084410 A1 | 4/2006 | Sutaria et al. |
| 2006/0218630 A1 | 9/2006 | Pearson et al. |
| 2006/0223530 A1 | 10/2006 | Bumiller |
| 2007/0208744 A1 | 9/2007 | Krishnaprasad et al. |
| 2007/0208746 A1 | 9/2007 | Koide et al. |
| 2007/0220268 A1 | 9/2007 | Krishnaprasad et al. |
| 2007/0283425 A1 | 12/2007 | Ture et al. |
| 2007/0289024 A1 | 12/2007 | Mohammed |
| 2008/0021997 A1 | 1/2008 | Hinton |
| 2009/0089625 A1 | 4/2009 | Kannappan et al. |
| 2009/0100136 A1 | 4/2009 | Jarenskog et al. |
| 2009/0119763 A1 | 5/2009 | Park et al. |
| 2009/0187974 A1 | 7/2009 | Fulshibagwale et al. |
| 2009/0276771 A1 | 11/2009 | Nickolov et al. |
| 2009/0293108 A1 | 11/2009 | Weeden |
| 2010/0122340 A1 | 5/2010 | Chow et al. |
| 2012/0233665 A1 | 9/2012 | Ranganathan et al. |
| 2012/0260322 A1 | 10/2012 | Logan et al. |
| 2012/0278872 A1 | 11/2012 | Woelfel et al. |
| 2012/0323686 A1 | 12/2012 | Burger et al. |
| 2013/0117831 A1 | 5/2013 | Hook et al. |
| 2014/0020073 A1 | 1/2014 | Ronda et al. |
| 2014/0040993 A1 | 2/2014 | Lorenzo et al. |
| 2014/0101055 A1 | 4/2014 | Grissom et al. |
| 2014/0101723 A1 | 4/2014 | Wilkes et al. |
| 2014/0153706 A1 | 6/2014 | Boone, Jr. |
| 2014/0250511 A1 | 9/2014 | Kendall |
| 2014/0337053 A1 | 11/2014 | Smith |
| 2014/0337513 A1 | 11/2014 | Amalapurapu et al. |
| 2015/0052587 A1 | 2/2015 | D'Neill et al. |
| 2015/0254450 A1 | 9/2015 | Ravi et al. |
| 2015/0256337 A1 | 9/2015 | Nguyen et al. |
| 2015/0347765 A1 | 12/2015 | Hankins, Jr. et al. |
| 2016/0092870 A1 | 3/2016 | Salama et al. |
| 2016/0094546 A1 | 3/2016 | Innes et al. |
| 2016/0239649 A1* | 8/2016 | Zhao ................... H04W 12/065 |
| 2016/0277481 A1 | 9/2016 | Yang |
| 2016/0307194 A1 | 10/2016 | Bhatnagar et al. |
| 2016/0308845 A1 | 10/2016 | Quinlan |
| 2016/0381080 A1 | 12/2016 | Reddem et al. |
| 2017/0041296 A1 | 2/2017 | Ford et al. |
| 2017/0048252 A1 | 2/2017 | Straub et al. |
| 2017/0068934 A1 | 3/2017 | Bos |
| 2017/0078225 A1 | 3/2017 | Pandey et al. |
| 2017/0142080 A1 | 5/2017 | Hill |
| 2017/0149770 A1 | 5/2017 | Hinton et al. |
| 2017/0227995 A1 | 8/2017 | Lee et al. |
| 2017/0230344 A1 | 8/2017 | Dhar et al. |
| 2017/0244757 A1 | 8/2017 | Castinado et al. |
| 2017/0317993 A1* | 11/2017 | Weber ..................... H04L 63/08 |
| 2017/0331816 A1 | 11/2017 | Votaw et al. |
| 2017/0346821 A1 | 11/2017 | Yedidi et al. |
| 2018/0007553 A1 | 1/2018 | Dutt et al. |
| 2018/0020009 A1 | 1/2018 | Wei et al. |
| 2018/0063122 A1 | 3/2018 | Enoki et al. |
| 2018/0077568 A1 | 3/2018 | Young et al. |
| 2018/0131685 A1 | 5/2018 | Sridhar et al. |
| 2018/0139111 A1 | 5/2018 | Lugiai et al. |
| 2018/0139199 A1 | 5/2018 | Ahuja et al. |
| 2018/0145830 A1 | 5/2018 | Henretty et al. |
| 2018/0164959 A1 | 6/2018 | Gupta et al. |
| 2018/0167816 A1 | 6/2018 | Kusens et al. |
| 2018/0183586 A1 | 6/2018 | Bhargav-Spantzel et al. |
| 2018/0234464 A1 | 8/2018 | Sim et al. |
| 2018/0249285 A1 | 8/2018 | Shaw et al. |
| 2018/0249292 A1 | 8/2018 | Skaaksrud |
| 2018/0251132 A1 | 9/2018 | Phelan |
| 2018/0253682 A1 | 9/2018 | Gilman et al. |
| 2018/0253713 A1 | 9/2018 | Ready et al. |
| 2018/0253718 A1 | 9/2018 | Khan et al. |
| 2018/0253840 A1 | 9/2018 | Tran |
| 2018/0254101 A1 | 9/2018 | Gilmore et al. |
| 2018/0255000 A1 | 9/2018 | Castinado et al. |
| 2018/0255060 A1 | 9/2018 | Bansal |
| 2018/0255084 A1 | 9/2018 | Kotinas et al. |
| 2018/0255422 A1 | 9/2018 | Montemurro et al. |
| 2018/0255456 A1 | 9/2018 | Yin et al. |
| 2018/0260384 A1 | 9/2018 | Pasupalak et al. |
| 2018/0260553 A1 | 9/2018 | Hoyos et al. |
| 2018/0260641 A1 | 9/2018 | Yadhunandan et al. |
| 2018/0260743 A1 | 9/2018 | Block et al. |
| 2018/0261060 A1 | 9/2018 | Siminoff et al. |
| 2018/0261126 A1 | 9/2018 | Rios et al. |
| 2018/0262388 A1 | 9/2018 | Johnson et al. |
| 2018/0262529 A1 | 9/2018 | Allen |
| 2018/0262597 A1 | 9/2018 | Matthieu et al. |
| 2018/0262620 A1 | 9/2018 | Wolthuis et al. |
| 2018/0262810 A1 | 9/2018 | Cronk et al. |
| 2018/0262909 A1 | 9/2018 | Rotter et al. |
| 2018/0264347 A1 | 9/2018 | Tran et al. |
| 2018/0268015 A1 | 9/2018 | Sugaberry |
| 2018/0268408 A1 | 9/2018 | Botros et al. |
| 2018/0268632 A1 | 9/2018 | Malhotra |
| 2018/0268674 A1 | 9/2018 | Siminoff |
| 2018/0268691 A1 | 9/2018 | Meredith et al. |
| 2018/0268818 A1 | 9/2018 | Schoenmackers et al. |
| 2018/0268944 A1 | 9/2018 | Prakash |
| 2018/0269554 A1 | 9/2018 | Sanford |
| 2018/0269927 A1 | 9/2018 | Gerszberg et al. |
| 2018/0270276 A9 | 9/2018 | Logue et al. |
| 2018/0270549 A1 | 9/2018 | Awiszus et al. |
| 2018/0270608 A1 | 9/2018 | Thoresen et al. |
| 2018/0270612 A1 | 9/2018 | Thoresen et al. |
| 2018/0274876 A1 | 9/2018 | Stewart et al. |
| 2018/0275765 A1 | 9/2018 | Roth et al. |
| 2018/0276041 A1 | 9/2018 | Bansal et al. |
| 2018/0276205 A1 | 9/2018 | Auger |
| 2018/0276261 A1 | 9/2018 | Smart |
| 2018/0276495 A1 | 9/2018 | Yu et al. |
| 2018/0276710 A1 | 9/2018 | Tietzen et al. |
| 2018/0278496 A1 | 9/2018 | Kulshreshtha et al. |
| 2018/0278597 A1 | 9/2018 | Helms et al. |

(56) References Cited

U.S. PATENT DOCUMENTS

| | | |
|---|---|---|
| 2018/0278648 A1 | 9/2018 | Li et al. |
| 2018/0278740 A1 | 9/2018 | Choi et al. |
| 2018/0300391 A1 | 10/2018 | San Vicente et al. |
| 2018/0301148 A1 | 10/2018 | Roman et al. |
| 2018/0301149 A1 | 10/2018 | Roman et al. |
| 2018/0302284 A1 | 10/2018 | Roman et al. |
| 2018/0302285 A1 | 10/2018 | Roman et al. |
| 2018/0302362 A1 | 10/2018 | Abedini et al. |
| 2018/0302363 A1 | 10/2018 | Abedini et al. |
| 2018/0302418 A1 | 10/2018 | Scasny |
| 2018/0302420 A1 | 10/2018 | Nakanelua et al. |
| 2018/0302423 A1 | 10/2018 | Muddu et al. |
| 2018/0302425 A1 | 10/2018 | Esman, Sr. et al. |
| 2018/0307303 A1 | 10/2018 | Powderly et al. |
| 2018/0307399 A1 | 10/2018 | Sandilya et al. |
| 2018/0307908 A1 | 10/2018 | O'Brien et al. |
| 2018/0307909 A1 | 10/2018 | O'Brien et al. |
| 2018/0308073 A1 | 10/2018 | Kurian et al. |
| 2018/0308100 A1 | 10/2018 | Haukioja et al. |
| 2018/0308473 A1 | 10/2018 | Scholar |
| 2018/0309752 A1 | 10/2018 | Villavicencio et al. |
| 2018/0310159 A1 | 10/2018 | Katz et al. |
| 2018/0314689 A1 | 11/2018 | Wang et al. |
| 2018/0315110 A1 | 11/2018 | Kannan et al. |
| 2018/0315499 A1 | 11/2018 | Appelbaum et al. |
| 2018/0316852 A1 | 11/2018 | Graham et al. |
| 2018/0317146 A1 | 11/2018 | Fitzpatrick |
| 2018/0320967 A1 | 11/2018 | Kaloudis et al. |
| 2018/0321185 A1 | 11/2018 | Bantas et al. |
| 2018/0321666 A1 | 11/2018 | Cella et al. |
| 2018/0321667 A1 | 11/2018 | Cella et al. |
| 2018/0321672 A1 | 11/2018 | Cella et al. |
| 2018/0322419 A1 | 11/2018 | Bugenhagen |
| 2018/0322436 A1 | 11/2018 | Sotiroudas et al. |
| 2018/0322879 A1 | 11/2018 | Bhaya et al. |
| 2018/0322961 A1 | 11/2018 | Kim et al. |
| 2018/0326150 A1 | 11/2018 | Davis et al. |
| 2018/0326291 A1 | 11/2018 | Tran et al. |
| 2018/0329738 A1 | 11/2018 | Kasha et al. |
| 2018/0329744 A1 | 11/2018 | Shear et al. |
| 2018/0330000 A1 | 11/2018 | Noble et al. |
| 2018/0330059 A1 | 11/2018 | Bates et al. |
| 2018/0330248 A1 | 11/2018 | Burhanuddin et al. |
| 2018/0330417 A1 | 11/2018 | Wollmer et al. |
| 2018/0332132 A1 | 11/2018 | Sampath et al. |
| 2018/0335776 A1 | 11/2018 | Theis et al. |
| 2018/0336638 A1 | 11/2018 | Dziabiak et al. |
| 2018/0336639 A1 | 11/2018 | Dziabiak et al. |
| 2018/0336640 A1 | 11/2018 | Dziabiak et al. |
| 2018/0336641 A1 | 11/2018 | Dziabiak et al. |
| 2018/0336905 A1 | 11/2018 | Kim et al. |
| 2018/0337966 A1 | 11/2018 | Pearl et al. |
| 2018/0338120 A1 | 11/2018 | Lemberger et al. |
| 2018/0338330 A1 | 11/2018 | Ledvina et al. |
| 2018/0349581 A1 | 12/2018 | Ramalingam |
| 2018/0359238 A1 | 12/2018 | Appiah et al. |
| 2018/0359242 A1 | 12/2018 | Appiah et al. |
| 2019/0020646 A1 | 1/2019 | Magyar et al. |
| 2019/0028462 A1 | 1/2019 | Ishikawa et al. |
| 2019/0057386 A1 | 2/2019 | Fazeli et al. |
| 2019/0058706 A1 | 2/2019 | Feijoo et al. |
| 2019/0098503 A1 | 3/2019 | Dutt et al. |
| 2019/0158497 A1 | 5/2019 | Diaz Cuellar et al. |
| 2019/0166112 A1 | 5/2019 | Gordon et al. |
| 2019/0166485 A1 | 5/2019 | Namiranian |
| 2019/0190704 A1 | 6/2019 | Srivastava et al. |
| 2019/0220583 A1 | 7/2019 | Douglas et al. |
| 2019/0245848 A1 | 8/2019 | Divoux et al. |
| 2019/0332691 A1 | 10/2019 | Beadles et al. |
| 2019/0372968 A1 | 12/2019 | Balogh et al. |
| 2019/0392162 A1 | 12/2019 | Stern et al. |
| 2020/0007530 A1 | 1/2020 | Mohamad Abdul et al. |
| 2020/0162454 A1 | 5/2020 | Jain et al. |
| 2020/0184048 A1 | 6/2020 | Toth et al. |
| 2020/0184049 A1 | 6/2020 | Toth et al. |
| 2020/0184050 A1 | 6/2020 | Toth et al. |
| 2020/0184051 A1 | 6/2020 | Toth et al. |
| 2020/0184065 A1 | 6/2020 | Toth et al. |
| 2020/0186518 A1 | 6/2020 | Shah |
| 2020/0235933 A1 | 7/2020 | Redkokashin |

OTHER PUBLICATIONS

Aug. 13, 2020 U.S. Non-Final Office Action—U.S. Appl. No. 16/210,117.
Aug. 4, 2020 U.S. Non-Final Office Action—U.S. Appl. No. 16/210,028.
Dec. 11, 2020 U.S. Notice of Allowance and Fees Due—U.S. Appl. No. 16/210,062.
Dec. 15, 2020 U.S. Notice of Allowance and Fees Due—U.S. Appl. No. 16/210,117.
Dec. 7, 2020 U.S. Notice of Allowance and Fees Due—U.S. Appl. No. 16/210,028.
Dec. 9, 2020 U.S. Notice of Allowance and Fees Due—U.S. Appl. No. 16/210,042.
Nov. 23, 2020 U.S. Notice of Allowance and Fees Due—U.S. Appl. No. 16/210,092.
Apr. 29, 2021—U.S. Notice of Allowance—U.S. Appl. No. 16/210,117.
Jul. 1, 2021—U.S. Notice of Allowance—U.S. Appl. No. 16/210,028.
Jun. 30, 2021—U.S. Notice of Allowance—U.S. Appl. No. 16/210,042.
Mar. 10, 2021—U.S. Notice of Allowance—U.S. Appl. No. 16/210,092.
Mar. 24, 2021 U.S. Notice of Allowance and Fees Due—U.S. Appl. No. 16/210,028.
Dec. 14, 2022—U.S. Non-Final Office Action—U.S. Appl. No. 17/447,304.
Sep. 15, 2022—U.S. Non-Final Office Action—U.S. Appl. No. 17/317,979.
Dec. 19, 2022—U.S. Notice of Allowance—U.S. Appl. No. 17/332,557.
Apr. 5, 2023—U.S. Final Office Action—U.S. Appl. No. 17/447,304.
Mar. 13, 2023—U.S. Notice of Allowance—U.S. Appl. No. 17/332,557.
Jun. 20, 2023—U.S. Notice of Allowance—U.S. Appl. No. 17/317,979.
Jun. 28, 2023—U.S. Notice of Allowance—U.S. Appl. No. 17/332,557.

* cited by examiner

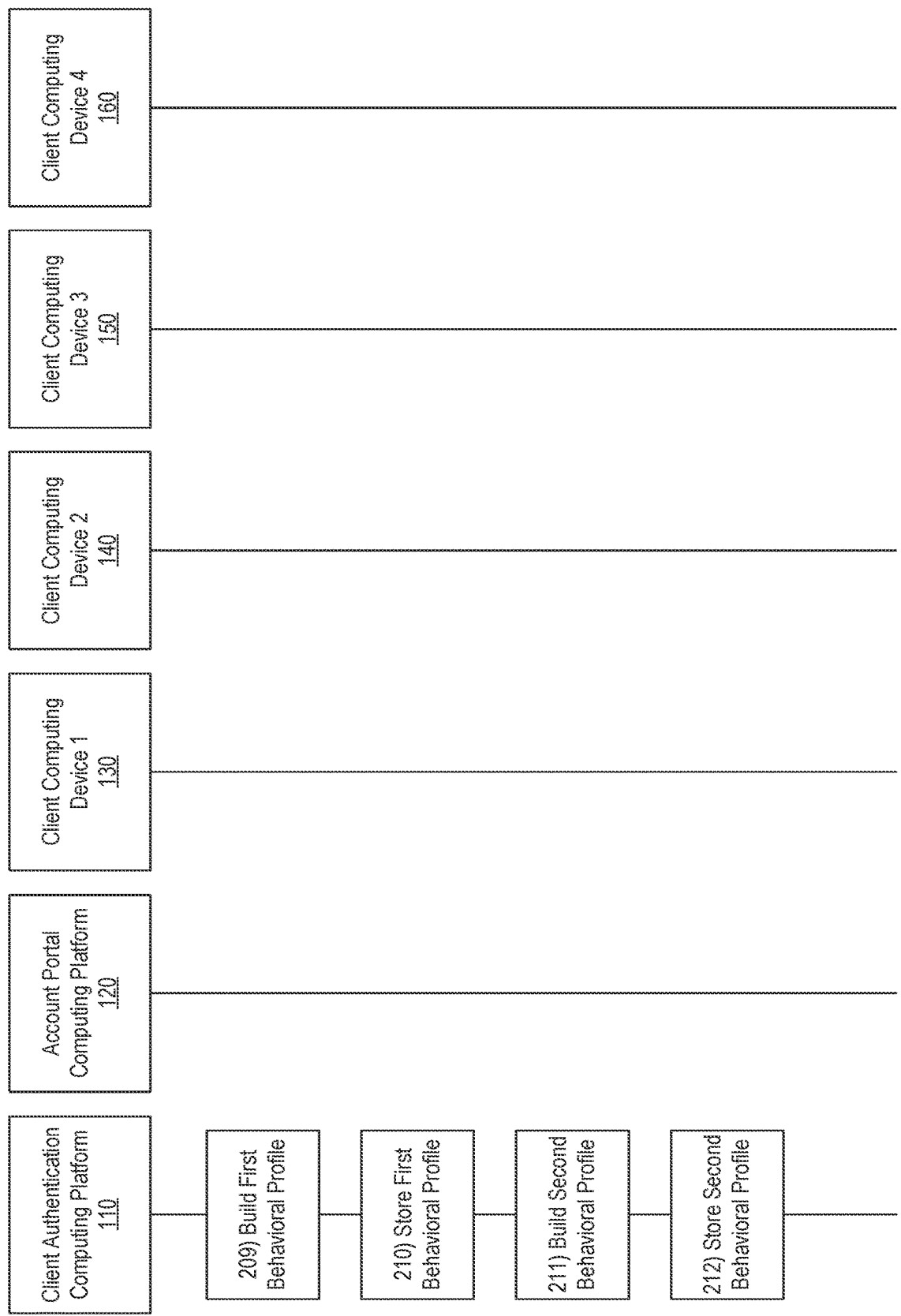

PROCESSING AUTHENTICATION REQUESTS TO SECURED INFORMATION SYSTEMS BASED ON MACHINE-LEARNED USER BEHAVIOR PROFILES

CROSS REFERENCE TO RELATED APPLICATIONS

This application is a continuation of and claims priority to co-pending U.S. application Ser. No. 16/210,010, filed Dec. 5, 2018, and originally entitled "Processing Authentication Requests to Secured Information Systems Based on Machine-Learned User Behavior Profiles," (amended title to, "Processing Authentication Requests to Secured Information Systems Based on User Behavior Profiles") which is incorporated herein by reference in its entirety.

BACKGROUND

Aspects of the disclosure relate to providing information security and preventing unauthorized access to resources of an information system. In particular, one or more aspects of the disclosure relate to preventing unauthorized access to information resources by processing authentication requests to secured information systems based on machine-learned user behavior profiles.

As organizations increasingly provide electronic portals via which various users may access, view, and/or modify information, including client information, ensuring the safety and security of information maintained by such organizations and/or made available via such portals is increasingly important. In many instances, however, it may be difficult to ensure the safety and security of such information while also optimizing the efficient and effective technical operations of the computer systems that maintain such information and/or provide such portals.

SUMMARY

Aspects of the disclosure provide effective, efficient, scalable, and convenient technical solutions that address and overcome the technical problems associated with providing information security and preventing unauthorized access to resources of an information system by using machine-learned user behavior profiles in processing authentication requests.

In accordance with one or more embodiments, a computing platform having at least one processor, a communication interface, and memory may receive, via the communication interface, from an account portal computing platform, a first authentication request corresponding to a request for a first user of a first client computing device to access one or more secured information resources associated with a first user account in a first client portal session. Based on receiving the first authentication request from the account portal computing platform, the computing platform may capture one or more behavioral parameters associated with the first client computing device. Subsequently, the computing platform may evaluate the one or more behavioral parameters associated with the first client computing device using a first behavioral profile associated with the first user account to determine a first behavioral deviation score. Based on the first behavioral deviation score, the computing platform may select a first authentication action from a plurality of pre-defined authentication actions. Subsequently, the computing platform may generate, based on the first authentication action selected from the plurality of pre-defined authentication actions, one or more commands directing the account portal computing platform to allow access, conditionally allow access, or prevent access to the one or more secured information resources associated with the first user account in the first client portal session. Then, the computing platform may send, via the communication interface, to the account portal computing platform, the one or more commands directing the account portal computing platform to allow access, conditionally allow access, or prevent access to the one or more secured information resources associated with the first user account in the first client portal session.

In some embodiments, receiving the first authentication request from the account portal computing platform may include receiving one or more login credentials associated with the first user account.

In some embodiments, capturing the one or more behavioral parameters associated with the first client computing device may include probing the first client computing device to obtain device information from the first client computing device. In some embodiments, capturing the one or more behavioral parameters associated with the first client computing device may include receiving, via the communication interface, from the account portal computing platform, activity information associated with the first client computing device.

In some embodiments, capturing the one or more behavioral parameters associated with the first client computing device may include capturing one or more authenticators used by the first user of the first client computing device in requesting access to the one or more secured information resources associated with the first user account and capturing information identifying one or more events requested by the first user of the first client computing device. In some embodiments, capturing the one or more behavioral parameters associated with the first client computing device may include capturing one or more of a device identifier associated with the first client computing device, a device location associated with the first client computing device, a network address associated with the first client computing device, an internet service provider associated with the first client computing device, a mobile or desktop indicator associated with the first client computing device, a time zone setting associated with the first client computing device, or a language setting associated with the first client computing device.

In some embodiments, the first behavioral profile associated with the first user account used in evaluating the one or more behavioral parameters associated with the first client computing device may be determined by the computing platform based on interaction data captured by the computing platform during previous interactions with the first client computing device.

In some embodiments, evaluating the one or more behavioral parameters associated with the first client computing device using the first behavioral profile associated with the first user account to determine the first behavioral deviation score may include summing one or more distance increments for each identified difference of one or more identified differences between the one or more behavioral parameters associated with the first client computing device and one or more historical parameters associated with the first behavioral profile associated with the first user account.

In some embodiments, the plurality of pre-defined authentication actions may include permitting access to a specific user account without further authentication, permitting access to the specific user account upon one or more successful responses to one or more challenge prompts generated by the computing platform, and denying access to the specific user account.

In some embodiments, prior to receiving the first authentication request from the account portal computing platform, the computing platform may capture first interaction data associated with the first user using the first client computing device to access the one or more secured information resources associated with the first user account. Subsequently, the computing platform may log the first interaction data in a client authentication database. Thereafter, the computing platform may capture second interaction data associated with the first user using a second client computing device to access the one or more secured information resources associated with the first user account. Subsequently, the computing platform may log the second interaction data in the client authentication database.

In some embodiments, the computing platform may build the first behavioral profile associated with the first user account based on the first interaction data and the second interaction data. In addition, the computing platform may store the first behavioral profile associated with the first user account in the client authentication database.

In some embodiments, after sending the one or more commands directing the account portal computing platform to allow access, conditionally allow access, or prevent access to the one or more secured information resources associated with the first user account in the first client portal session, the computing platform may update the first behavioral profile associated with the first user account based on fifth interaction data captured by the computing platform during the first client portal session.

In some embodiments, the computing platform may receive, via the communication interface, from the account portal computing platform, a second authentication request corresponding to a request for a second user of a third client computing device to access one or more secured information resources associated with a second user account in a second client portal session. Based on receiving the second authentication request from the account portal computing platform, the computing platform may capture one or more behavioral parameters associated with the third client computing device. Subsequently, the computing platform may evaluate the one or more behavioral parameters associated with the third client computing device using a second behavioral profile associated with the second user account to determine a second behavioral deviation score. Based on the second behavioral deviation score, the computing platform may select a second authentication action from the plurality of pre-defined authentication actions. Subsequently, the computing platform may generate, based on the second authentication action selected from the plurality of pre-defined authentication actions, one or more commands directing the account portal computing platform to allow access, conditionally allow access, or prevent access to the one or more secured information resources associated with the second user account in the second client portal session. Then, the computing platform may send, via the communication interface, to the account portal computing platform, the one or more commands directing the account portal computing platform to allow access, conditionally allow access, or prevent access to the one or more secured information resources associated with the second user account in the second client portal session.

In some embodiments, prior to receiving the second authentication request from the account portal computing platform, the computing platform may capture third interaction data associated with the second user using the third client computing device to access the one or more secured information resources associated with the second user account. Subsequently, the computing platform may log the third interaction data in a client authentication database. Thereafter, the computing platform may capture fourth interaction data associated with the second user using a fourth client computing device to access the one or more secured information resources associated with the second user account. Subsequently, the computing platform may log the fourth interaction data in the client authentication database.

In some embodiments, the computing platform may build the second behavioral profile associated with the second user account based on the third interaction data and the fourth interaction data. In addition, the computing platform may store the second behavioral profile associated with the second user account in the client authentication database.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for processing authentication requests to secured information systems based on machine-learned user behavior profiles in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to generating and using behavioral profiles for customers to control authentication requests. For example, a customer's interaction data may be analyzed across different channels and across different accounts to build a behavioral profile for the customer. The profile may be generated based on activity in historical sessions and may be used to evaluate activity in a current session using a machine-learning algorithm. In some instances, a risk score may be calculated based on a degree to which user activity in a current session deviates from historical past activity. In some instances, if the risk score exceeds a first threshold, a challenge may be generated, and if the risk score exceeds a second threshold, the request may be denied. The behavioral profile may be generated based on a plurality of previous login events and various parameters associated with each previous login event. Such parameters may, for example, include: what device is being used; where the device is being used from; the time the event is occurring; what authenticators the user is using (e.g., password, fingerprint biometrics, face biometrics, and/or the like); what network address (e.g., IP address) the request originates from; what internet service provider (ISP) the request originates from; whether the request is from a mobile device or PC; what time zone the user device is using; what language settings and/or other settings the user device is using; and/or the like. A machine-learning algorithm may evaluate the user's current authentication request and behavior against the behavioral profile to determine an authentication-focused risk score or risk state. This authentication process may be applied to online banking and mobile banking channels, and in some instances, may be extended to interactive voice response (IVR) authentication, contact center authentication, and/or the like.

Figure 1A:
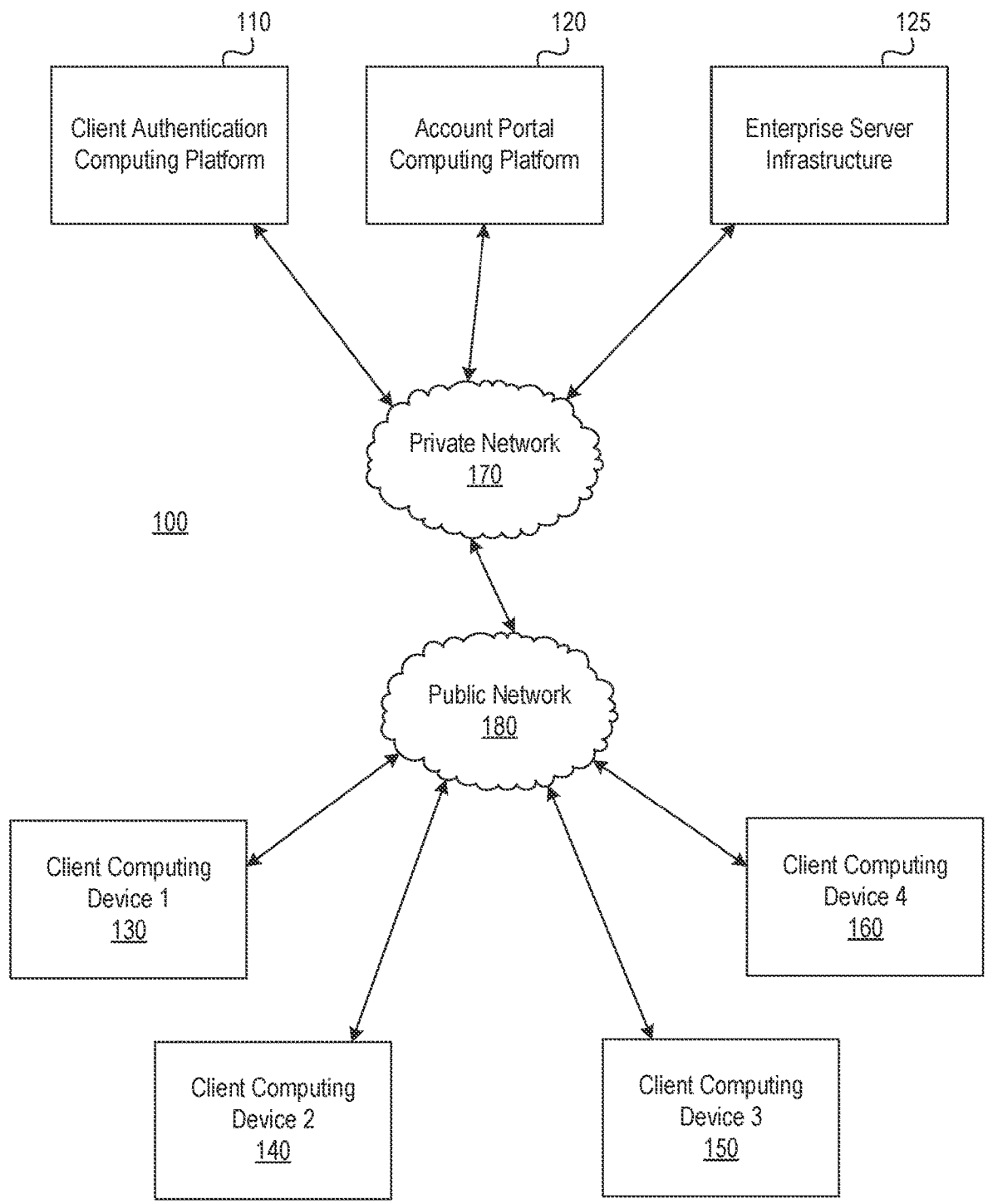
FIGS. 1A and 1B depict an illustrative computing environment for processing authentication requests to secured information systems based on machine-learned user behavior profiles in accordance with one or more example embodiments.
Figure 1B:
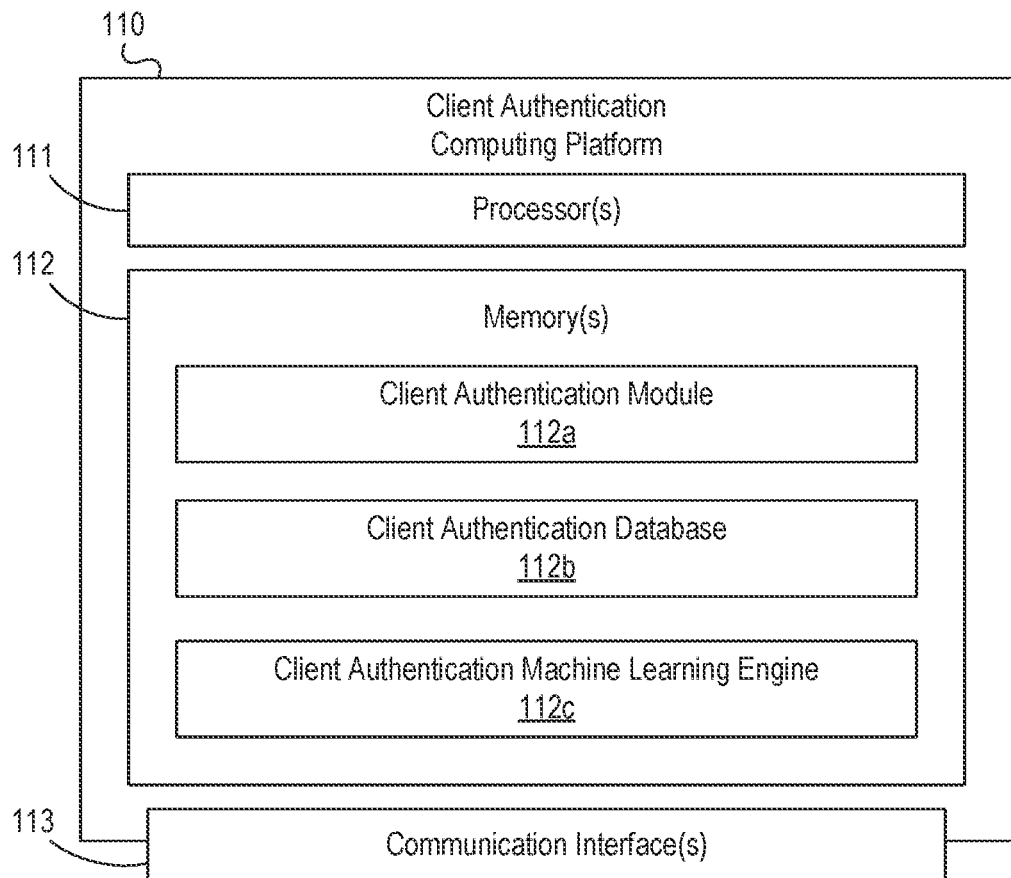

FIGS. 1A and 1B depict an illustrative computing environment for processing authentication requests to secured information systems based on machine-learned user behavior profiles in accordance with one or more example embodiments. Referring to FIG. 1A, computing environment 100 may include one or more computer systems. For example, computing environment 100 may include a client authentication computing platform 110, an account portal computing platform 120, enterprise server infrastructure 125, a first client computing device 130, a second client computing device 140, a third client computing device 150, and a fourth client computing device 160.

As illustrated in greater detail below, client authentication computing platform 110 may include one or more computing devices configured to perform one or more of the functions described herein. For example, client authentication computing platform 110 may include one or more computers (e.g., laptop computers, desktop computers, servers, server blades, or the like).

Account portal computing platform 120 may include one or more computing devices and/or other computer components (e.g., processors, memories, communication interfaces). In addition, and as illustrated in greater detail below, account portal computing platform 120 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by account portal computing platform 120 may be associated with a client portal provided by an organization, such as an online banking portal or a mobile banking portal provided by a financial institution. Such a portal may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like).

Enterprise server infrastructure 125 may include one or more computing devices and/or other computer components (e.g., processors, memories, communication interfaces). In addition, and as illustrated in greater detail below, enterprise server infrastructure 125 may be configured to provide various enterprise and/or back-office computing functions for an organization, such as a financial institution. For example, enterprise server infrastructure 125 may include various servers and/or databases that store and/or otherwise maintain account information, such as financial account information including account balances, transaction history, account owner information, and/or other information. In addition, enterprise server infrastructure 125 may process and/or otherwise execute transactions on specific accounts based on commands and/or other information received from account portal computing platform 120 and/or other computer systems included in computing environment 100.

Client computing device 130 may be a personal computing device (e.g., desktop computer, laptop computer) or mobile computing device (e.g., smartphone, tablet) that may be linked to and/or used by a first user (e.g., of a client portal provided by account portal computing platform 120). Client computing device 140 may be a personal computing device (e.g., desktop computer, laptop computer) or mobile computing device (e.g., smartphone, tablet) that also may be linked to and/or used by the first user (e.g., of a client portal provided by account portal computing platform 120). Client computing device 150 may be a personal computing device (e.g., desktop computer, laptop computer) or mobile computing device (e.g., smartphone, tablet) that may be linked to and/or used by a second user (e.g., of a client portal provided by account portal computing platform 120) different from the first user. Client computing device 160 may be a personal computing device (e.g., desktop computer, laptop computer) or mobile computing device (e.g., smartphone, tablet) that also may be linked to and/or used by the second user (e.g., of a client portal provided by account portal computing platform 120).

Computing environment 100 also may include one or more networks, which may interconnect one or more of client authentication computing platform 110, account portal computing platform 120, enterprise server infrastructure 125, client computing device 130, client computing device 140, client computing device 150, and client computing device 160. For example, computing environment 100 may include a private network 170 (which may, e.g., interconnect client authentication computing platform 110, account portal computing platform 120, enterprise server infrastructure 125, and/or one or more other systems which may be associated with an organization, such as a financial institution) and public network 180 (which may, e.g., interconnect client computing device 130, client computing device 140, client computing device 150, and client computing device 160 with private network 170 and/or one or more other systems, public networks, sub-networks, and/or the like).

In one or more arrangements, client computing device 130, client computing device 140, client computing device 150, client computing device 160, and/or the other systems included in computing environment 100 may be any type of computing device capable of receiving a user interface, receiving input via the user interface, and communicating the received input to one or more other computing devices. For example, client computing device 130, client computing device 140, client computing device 150, client computing device 160, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of client authentication computing platform 110, account portal computing platform 120, enterprise server infrastructure 125, client computing device 130, client computing device 140, client computing device 150, and client computing device 160 may, in some instances, be special-purpose computing devices configured to perform specific functions.

Referring to FIG. 1B, client authentication computing platform 110 may include one or more processors 111, memory 112, and communication interface 113. A data bus may interconnect processor 111, memory 112, and communication interface 113. Communication interface 113 may be a network interface configured to support communication between client authentication computing platform 110 and one or more networks (e.g., network 170, network 180, or the like). Memory 112 may include one or more program modules having instructions that when executed by processor 111 cause client authentication computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of client authentication computing platform 110 and/or by different computing devices that may form and/or otherwise make up client authentication computing platform 110. For example, memory 112 may have, store, and/or include a client authentication module 112a, a client authentication database 112b, and a client authentication machine learning engine 112c. Client authentication module 112a may have instructions that direct and/or cause client authentication computing platform 110 to control access to resources of an information system by processing authentication requests based on machine-learned user behavior profiles, as discussed in greater detail below. Client authentication database 112b may store information used by client authentication module 112a and/or client authentication computing platform 110 in controlling access to resources of an information system by processing authentication requests based on machine-learned user behavior profiles and/or in performing other functions. Client authentication machine learning engine 112c may build and/or refine user behavioral profiles based on captured and/or logged user interaction data, as illustrated in greater detail below.

Figure 2A:
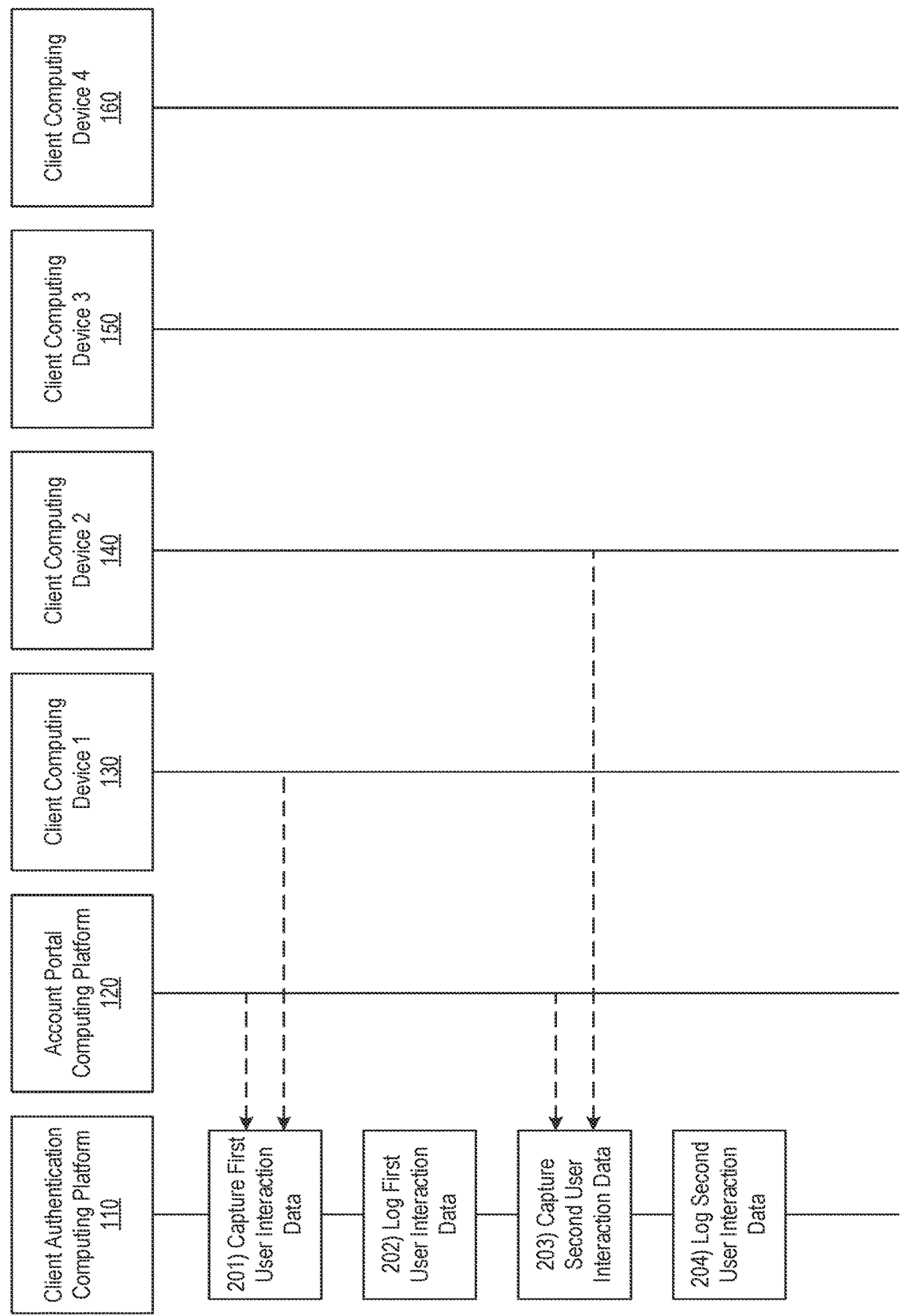

FIGS. 2A-2F depict an illustrative event sequence for processing authentication requests to secured information systems based on machine-learned user behavior profiles in accordance with one or more example embodiments. Referring to FIG. 2A, at step 201, client authentication computing platform 110 may capture first user interaction data from client computing device 130, account portal computing platform 120, and/or enterprise server infrastructure 125. For example, at step 201, client authentication computing platform 110 may capture first interaction data associated with the first user using the first client computing device (e.g., client computing device 130) to access one or more secured information resources associated with a first user account (which may, e.g., be associated with a client portal provided by account portal computing platform 120). At step 202, client authentication computing platform 110 may log the first user interaction data. For example, at step 202, client authentication computing platform 110 may log the first interaction data in a client authentication database (e.g., client authentication database 112b).

At step 203, client authentication computing platform 110 may capture second user interaction data from client computing device 140, account portal computing platform 120, and/or enterprise server infrastructure 125. For example, at step 203, client authentication computing platform 110 may capture second interaction data associated with the first user using a second client computing device (e.g., client computing device 140) to access the one or more secured information resources associated with the first user account. For instance, both client computing device 130 and client computing device 140 may belong to and be used by the first user, and in some instances, client computing device 130 and client computing device 140 may be used to access and/or interact with user account information on different channels (e.g., online banking channel, mobile banking channel, interactive voice response (IVR) channel, in-person banking channel, and/or other channels). Client authentication computing platform 110 may capture user interaction data associated with this access and/or interaction with the first user account across different channels and devices. In addition, client authentication computing platform 110 may receive different information from the user devices (e.g., client computing device 130, client computing device 140), account portal computing platform 120, and enterprise server infrastructure 125. For instance, client authentication computing platform 110 may track requests received from client computing device 130 and/or client computing device 140, client authentication computing platform 110 may receive portal activity information from account portal computing platform 120, and client authentication computing platform 110 may receive IVR activity information and/or other activity information from enterprise server infrastructure 125. At step 204, client authentication computing platform 110 may log the second user interaction data. For example, at step 204, client authentication computing platform 110 may log the second interaction data in the client authentication database (e.g., client authentication database 112b).

Figure 2B:
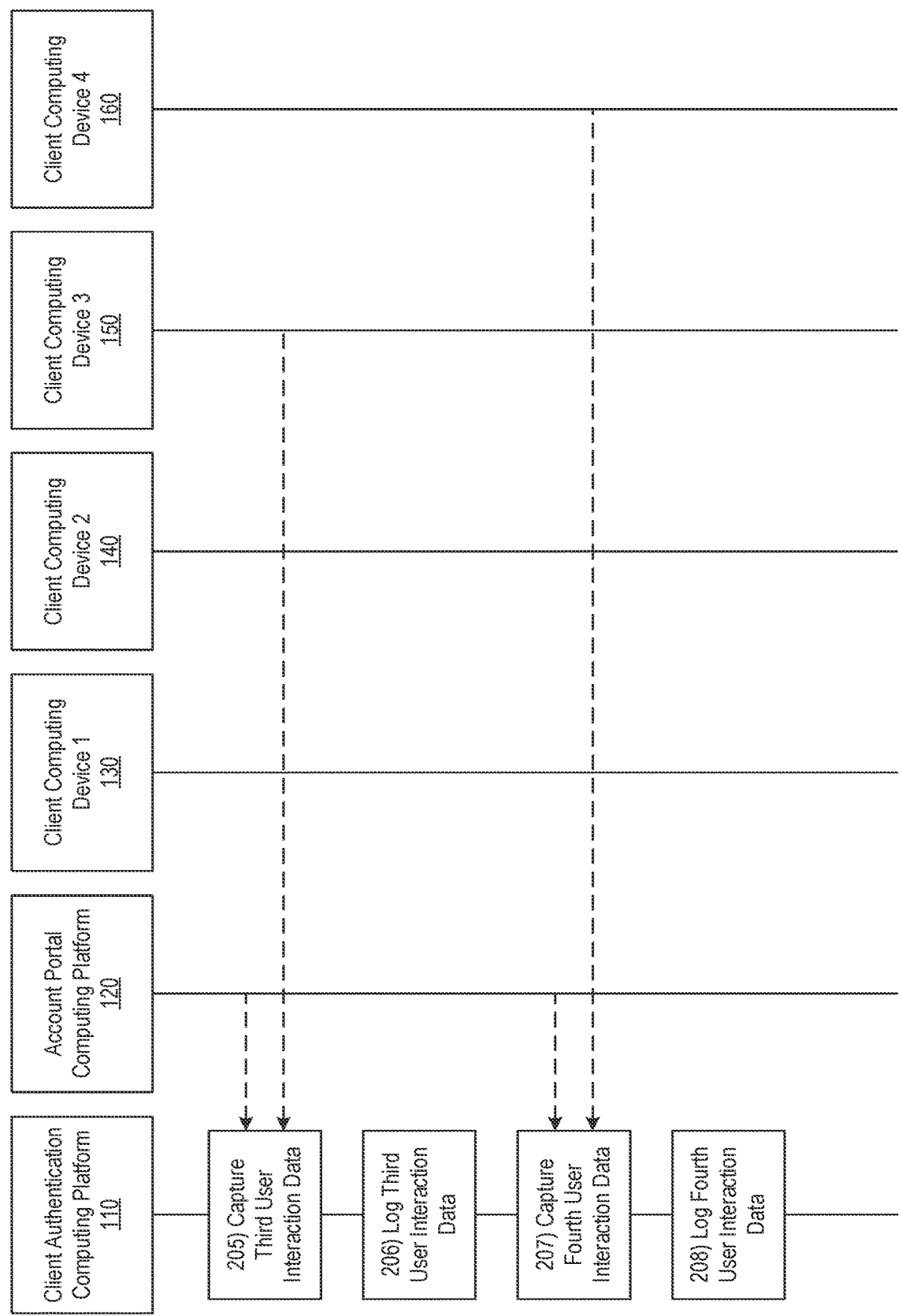

Referring to FIG. 2B, at step 205, client authentication computing platform 110 may capture third user interaction data from client computing device 150, account portal computing platform 120, and/or enterprise server infrastructure 125. For example, at step 205, client authentication computing platform 110 may capture third interaction data associated with a second user using a third client computing device (e.g., client computing device 150) to access one or more secured information resources associated with a second user account (which may, e.g., be associated with a client portal provided by account portal computing platform 120). At step 206, client authentication computing platform 110 may log the third user interaction data. For example, at step 206, client authentication computing platform 110 may log the third interaction data in a client authentication database (e.g., client authentication database 112b).

At step 207, client authentication computing platform 110 may capture fourth user interaction data from client computing device 160, account portal computing platform 120, and/or enterprise server infrastructure 125. For example, at step 207, client authentication computing platform 110 may capture fourth interaction data associated with the second user using a fourth client computing device (e.g., client computing device 160) to access the one or more secured information resources associated with the second user account. For instance, both client computing device 150 and client computing device 160 may belong to and be used by the second user, and in some instances, client computing device 150 and client computing device 160 may be used to access and/or interact with user account information on different channels (e.g., online banking channel, mobile banking channel, interactive voice response (IVR) channel, in-person banking channel, and/or other channels). Client authentication computing platform 110 may capture user interaction data associated with this access and/or interaction with the second user account across different channels and devices. In addition, client authentication computing platform 110 may receive different information from the user devices (e.g., client computing device 150, client computing device 160), account portal computing platform 120, and enterprise server infrastructure 125. For instance, client authentication computing platform 110 may track requests received from client computing device 150 and/or client computing device 160, client authentication computing platform 110 may receive portal activity information from account portal computing platform 120, and client authentication computing platform 110 may receive IVR activity information and/or other activity information from enterprise server infrastructure 125. At step 208, client authentication computing platform 110 may log the fourth user interaction data. For example, at step 208, client authentication computing platform 110 may log the fourth interaction data in the client authentication database (e.g., client authentication database 112*b*).

Referring to FIG. 2C, at step 209, client authentication computing platform 110 may build a first behavioral profile for the first user account (which may, e.g., be associated with client computing device 130 and client computing device 140). For example, at step 209, client authentication computing platform 110 may build the first behavioral profile associated with the first user account based on the first interaction data and the second interaction data. For instance, client authentication computing platform 110 may build the first behavioral profile for the first user account based on recorded activity and/or other interaction data in historical sessions. The behavioral profile may, for instance, include information identifying which devices have been used to create, access, and/or modify information associated with the user account, information identifying where such devices were located, information identifying when such devices were used to access the user account, information identifying what types of requests were received from such devices in connection with the user account, information indicating how many times specific devices were used to perform specific functions, and/or other historical data associated with specific devices accessing the specific user account to perform specific behaviors. In generating a behavioral profile, client authentication computing platform 110 may, for example, compile and/or organize historical interaction data into groupings corresponding to these and/or other parameters (which may, e.g., subsequently be used by client authentication computing platform 110 in evaluating authentication requests, as discussed below).

At step 210, client authentication computing platform 110 may store the first behavioral profile. For example, at step 210, client authentication computing platform 110 may store the first behavioral profile associated with the first user account in the client authentication database (e.g., client authentication database 112*b*).

At step 211, client authentication computing platform 110 may build a second behavioral profile for the second user account (which may, e.g., be associated with client computing device 150 and client computing device 160). For example, at step 211, client authentication computing platform 110 may build the second behavioral profile associated with the second user account based on the third interaction data and the fourth interaction data. For instance, client authentication computing platform 110 may build the second behavioral profile for the second user account based on recorded activity and/or other interaction data in historical sessions, similar to how client authentication computing platform 110 may build the first behavioral profile for the first user account based on recorded activity and/or other interaction data in historical sessions. At step 212, client authentication computing platform 110 may store the second behavioral profile. For example, at step 212, client authentication computing platform 110 may store the second behavioral profile associated with the second user account in the client authentication database (e.g., client authentication database 112*b*).

Figure 3:
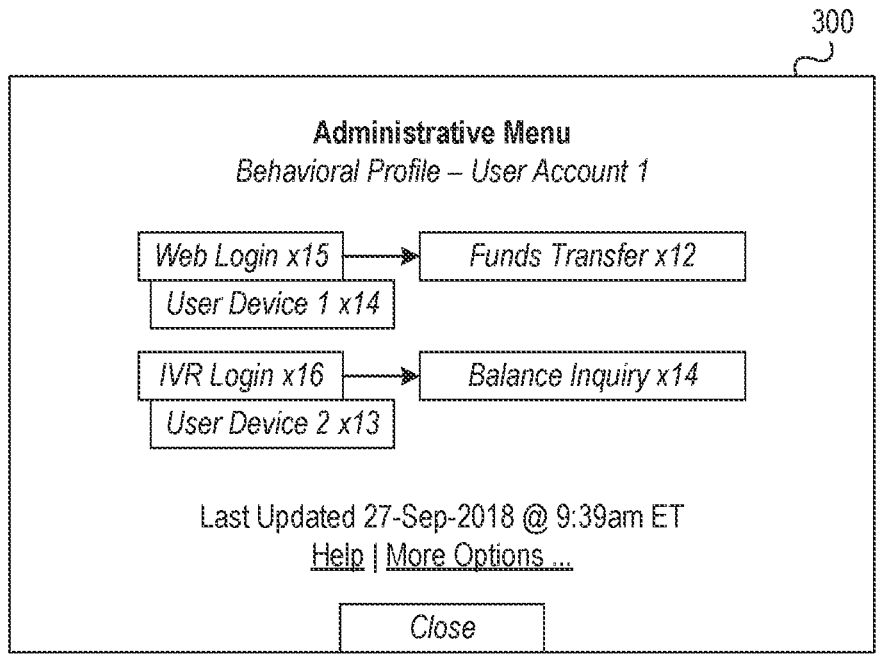
FIGS. 3-6 depict example graphical user interfaces for processing authentication requests to secured information systems based on machine-learned user behavior profiles in accordance with one or more example embodiments.

In some instances, the first behavioral profile and/or the second behavioral profile may be accessed, viewed, and/or modified by an administrative user (who may, e.g., interact with client authentication computing platform 110 using an administrative computing device). For example, client authentication computing platform 110 may generate and/or otherwise provide one or more user interfaces via which one or more behavioral profiles may be accessed, viewed, and/or modified. For instance, client authentication computing platform 110 may generate and/or otherwise provide one or more graphical user interfaces similar to graphical user interface 300, which is shown in FIG. 3. As seen in FIG. 3, graphical user interface 300 may include historical interaction data that has been compiled and organized into specific groupings that correspond to parameters that are usable by client authentication computing platform 110 in evaluating future authentication requests. For instance, in the example illustrated in FIG. 3, there may have been 15 web login events recorded for the first user account, and 14 of the 15 web login events may have been performed by a first user device. In addition, 12 of the 15 web login events may have involved a funds transfer request. In addition, in the example illustrated in FIG. 3, there may have been 16 IVR login events recorded for the first user account, and 13 of the 16 IVR login events may have been performed by a second user device. In addition, 14 of the 16 IVR login events may have involved a balance inquiry request. Any and/or all of this information may be used by client authentication computing platform 110 in evaluating future interactions (e.g., with a web portal provided by account portal computing platform 120) to determine a degree of similarity and/or a degree of difference between future requested interactions involving the user account and past recorded interactions involving the user account (which may, e.g., be used by client authentication computing platform 110 in selecting authentication methods and/or in determining whether to permit or deny access to the user account, as illustrated in greater detail below).

Figure 2D:
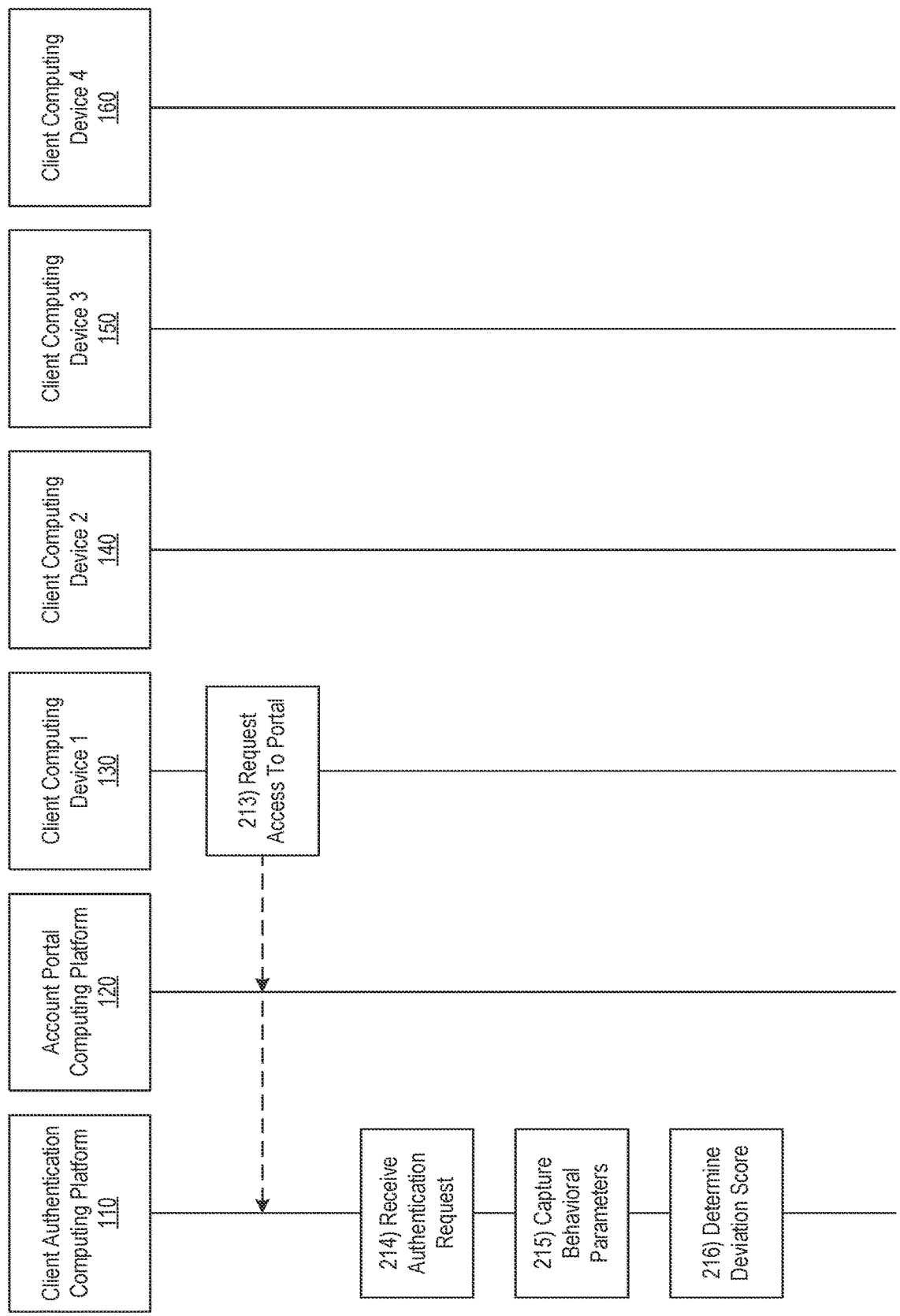

Referring to FIG. 2D, at step 213, client computing device 130 may send a request for portal access to account portal computing platform 120. For example, at step 213, client computing device 130 may request access to a client account portal provided by account portal computing platform 120. In response to receiving the request, account portal computing platform 120 may generate and/or send an authentication request to client authentication computing platform 110 to authenticate the user of client computing device 130 before providing access to secured information, such as client account information.

At step 214, client authentication computing platform 110 may receive an authentication request from account portal computing platform 120. For example, at step 214, client authentication computing platform 110 may receive, via the communication interface (e.g., communication interface 113), from an account portal computing platform (e.g., account portal computing platform 120), a first authentication request corresponding to a request for a first user of a first client computing device (e.g., client computing device 130) to access one or more secured information resources associated with a first user account in a first client portal session.

In some embodiments, receiving the first authentication request from the account portal computing platform may include receiving one or more login credentials associated with the first user account. For example, in receiving the first authentication request from the account portal computing platform (e.g., account portal computing platform 120), client authentication computing platform 110 may receive one or more login credentials associated with the first user account (e.g., a username associated with the first user account, a password associated with the first user account, and/or the like).

At step 215, client authentication computing platform 110 may capture one or more behavioral parameters associated with the request for access to the user account. For example, at step 215, based on receiving the first authentication request from the account portal computing platform (e.g., account portal computing platform 120), client authentication computing platform 110 may capture one or more behavioral parameters associated with the first client computing device (e.g., client computing device 130). For instance, in capturing the one or more behavioral parameters, client authentication computing platform 110 may identify and/or record information identifying what device is being used, where the device is being used from, the time the event is occurring, what authenticators the user is using (e.g., password, fingerprint biometrics, face biometrics, and/or others), what network address the request originates from, what internet service provider the request originates from, whether the request is from a mobile device or desktop computer, what time zone the user device is using, what language settings and/or other settings the user device is using, and/or other information.

In some embodiments, capturing the one or more behavioral parameters associated with the first client computing device may include probing the first client computing device to obtain device information from the first client computing device. For example, in capturing the one or more behavioral parameters associated with the first client computing device (e.g., client computing device 130), client authentication computing platform 110 may probe the first client computing device (e.g., client computing device 130) to obtain device information from the first client computing device (e.g., client computing device 130). Such probing may, for instance, involve client authentication computing platform 110 directly communicating with client computing device 130 to interrogate client computing device 130 as to its current device state (which may, e.g., indicate the device's operating system, installed applications, location, time zone, language settings, or other state information).

In some embodiments, capturing the one or more behavioral parameters associated with the first client computing device may include receiving, via the communication interface, from the account portal computing platform, activity information associated with the first client computing device. For example, in capturing the one or more behavioral parameters associated with the first client computing device (e.g., client computing device 130), client authentication computing platform 110 may receive, via the communication interface (e.g., communication interface 113), from the account portal computing platform (e.g., account portal computing platform 120), activity information associated with the first client computing device (e.g., client computing device 130). Such activity information may, for instance, identify interactions between client computing device 130 and account portal computing platform 120 in connection with the current request.

In some embodiments, capturing the one or more behavioral parameters associated with the first client computing device may include capturing one or more authenticators used by the first user of the first client computing device in requesting access to the one or more secured information resources associated with the first user account and capturing information identifying one or more events requested by the first user of the first client computing device. For example, in capturing the one or more behavioral parameters associated with the first client computing device (e.g., client computing device 130), client authentication computing platform 110 may capture one or more authenticators used by the first user of the first client computing device (e.g., client computing device 130) in requesting access to the one or more secured information resources associated with the first user account. In addition, client authentication computing platform 110 may capture information identifying one or more events requested by the first user of the first client computing device (e.g., client computing device 130). For instance, client authentication computing platform 110 may capture information identifying what authenticators were submitted and/or otherwise used (e.g., username, password, biometrics, and/or the like), what event type has been requested (e.g., balance inquiry, funds transfer, bill pay, and/or the like), and/or other information, and any and/or all of this information may be used by client authentication computing platform 110 in determining a deviation score and selecting an authentication action, as discussed in greater detail below.

In some embodiments, capturing the one or more behavioral parameters associated with the first client computing device may include capturing a device identifier associated with the first client computing device, a device location associated with the first client computing device, a network address associated with the first client computing device, an internet service provider associated with the first client computing device, a mobile or desktop indicator associated with the first client computing device, a time zone setting associated with the first client computing device, and/or a language setting associated with the first client computing device. For example, in capturing the one or more behavioral parameters associated with the first client computing device (e.g., client computing device 130), client authentication computing platform 110 may capture a device identifier associated with the first client computing device (e.g., client computing device 130), a device location associated with the first client computing device (e.g., client computing device 130), a network address associated with the first client computing device (e.g., client computing device 130), an internet service provider associated with the first client computing device (e.g., client computing device 130), a mobile or desktop indicator associated with the first client computing device (e.g., client computing device 130), a time zone setting associated with the first client computing device (e.g., client computing device 130), and/or a language setting associated with the first client computing device (e.g., client computing device 130). In addition, any and/or all of this information may be used by client authentication computing platform 110 in determining a deviation score and selecting an authentication action, as discussed in greater detail below.

At step 216, client authentication computing platform 110 may compare the captured behavioral parameters with the first behavioral profile to determine a deviation score (which may, e.g., dictate the selection of a particular authentication action, as discussed in greater detail below). For example, at step 216, client authentication computing platform 110 may evaluate the one or more behavioral parameters associated with the first client computing device (e.g., client computing device 130) using a first behavioral profile associated with the first user account to determine a first behavioral deviation score.

In some embodiments, the first behavioral profile associated with the first user account used in evaluating the one or more behavioral parameters associated with the first client computing device may be determined by the computing platform based on interaction data captured by the computing platform during previous interactions with the first client computing device. For example, the first behavioral profile associated with the first user account (which may, e.g., be used in evaluating the one or more behavioral parameters associated with client computing device 130 at step 216) may be determined by client authentication computing platform 110 based on interaction data captured by client authentication computing platform 110 during previous interactions with client computing device 130, as described above. For instance, client authentication computing platform 110 and/or client authentication machine learning engine 112c may compile and/or organize historical interaction data received and/or otherwise obtained from logs of historical interactions into groupings corresponding to various parameters to generate the first behavioral profile associated with the first user account.

In some embodiments, evaluating the one or more behavioral parameters associated with the first client computing device using the first behavioral profile associated with the first user account to determine the first behavioral deviation score may include summing one or more distance increments for each identified difference of one or more identified differences between the one or more behavioral parameters associated with the first client computing device and one or more historical parameters associated with the first behavioral profile associated with the first user account. For example, in evaluating the one or more behavioral parameters associated with the first client computing device (e.g., client computing device 130) using the first behavioral profile associated with the first user account to determine the first behavioral deviation score, client authentication computing platform 110 may sum one or more distance increments for each identified difference of one or more identified differences between the one or more behavioral parameters associated with the first client computing device (e.g., client computing device 130) and one or more historical parameters associated with the first behavioral profile associated with the first user account. For instance, each behavioral of the one or more behavioral parameters (e.g., device identifier, device location, and so on) may be associated with one or more pre-determined distance increment amounts (e.g., for different conditions and/or various possible values) and well as a pre-determined weight. The distance increments may be summed and weighted (e.g., by client authentication computing platform 110) to calculate the deviation score. By weighting certain parameters more than others, client authentication computing platform 110 may, for example, account for the fact that certain differences may be more significant than others when assessing account security. For instance, variances in certain factors (e.g., device identifier, time zone, language setting) may be weighed more heavily by client authentication computing platform 110 than variances in other factors (e.g., network address, device location, internet service provider).

Figure 2E:
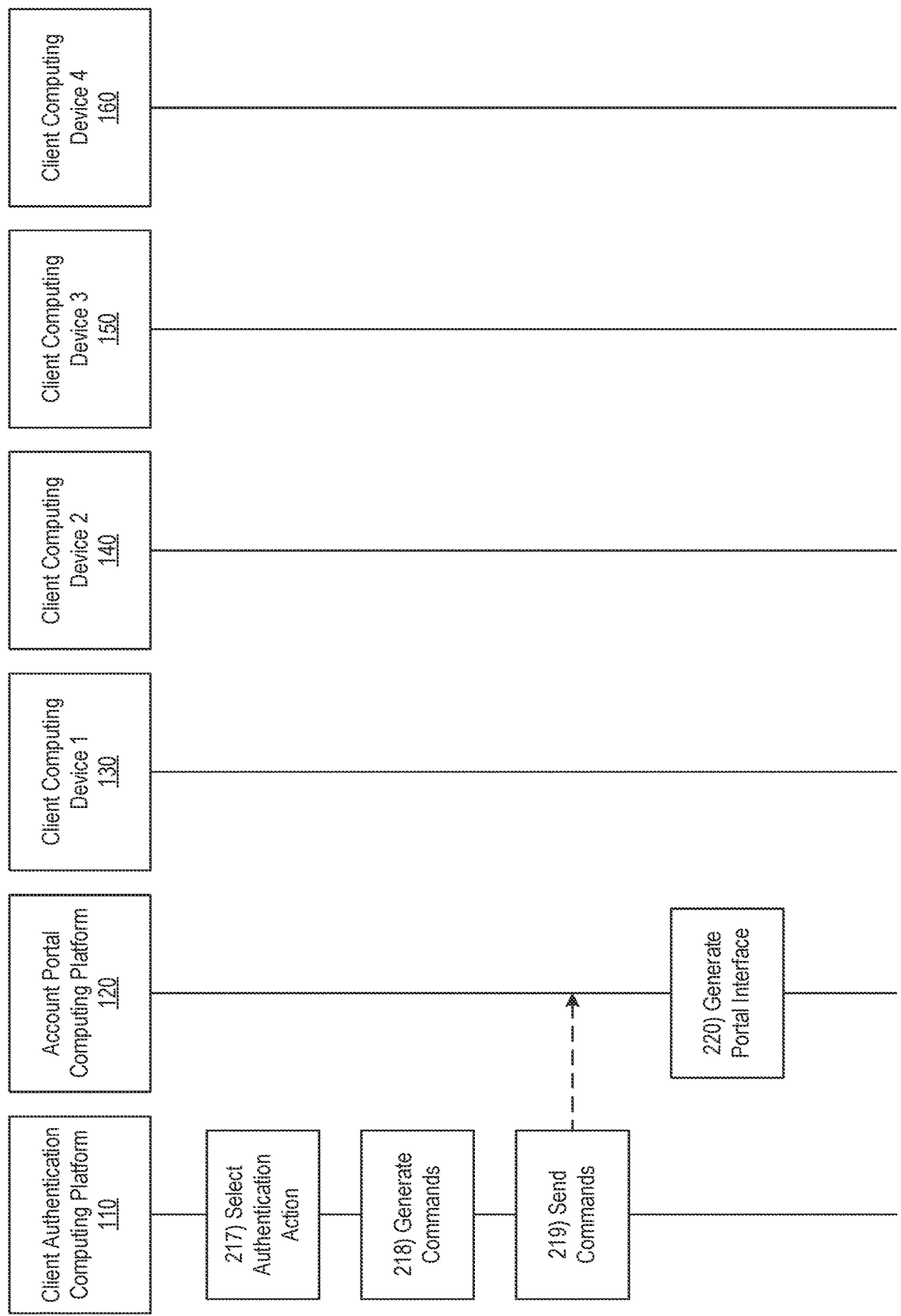

Referring to FIG. 2E, at step 217, client authentication computing platform 110 may select and/or otherwise determine an authentication action based on the determined deviation score. For example, at step 217, based on the first behavioral deviation score, client authentication computing platform 110 may select a first authentication action from a plurality of pre-defined authentication actions. For instance, client authentication computing platform 110 may compare the behavioral deviation score to a plurality of predefined thresholds to determine whether to allow access, deny access, or present one or more challenges. For example, if the behavioral deviation score exceeds a first threshold but not a second threshold, client authentication computing platform 110 may select a first authentication action (e.g., present one or more challenges); if the behavioral deviation score exceeds the second threshold, client authentication computing platform 110 may select a second authentication action (e.g., deny access); and if the behavioral deviation score does not exceed either threshold, client authentication computing platform 110 may select a third authentication action (e.g., allow access).

In some embodiments, the plurality of pre-defined authentication actions may include permitting access to a specific user account without further authentication, permitting access to the specific user account upon one or more successful responses to one or more challenge prompts generated by the computing platform, and denying access to the specific user account. For example, the plurality of pre-defined authentication actions (e.g., from which client authentication computing platform 110 may select the first authentication action) may include permitting access to a specific user account without further authentication, permitting access to the specific user account upon one or more successful responses to one or more challenge prompts generated by client authentication computing platform 110, and denying access to the specific user account. For instance, the one or more challenge prompts generated by client authentication computing platform 110 may include one or more one-time passcode prompts generated by client authentication computing platform 110, one or more security question prompts generated by client authentication computing platform 110, one or more biometric authentication prompts generated by client authentication computing platform 110, and/or one or more other authentication prompts generated by client authentication computing platform 110.

At step 218, client authentication computing platform 110 may generate one or more commands based on the selected authentication action (e.g., to allow access, allow access after one or more successful challenges, prevent access). For example, at step 218, client authentication computing platform 110 may generate, based on the first authentication action selected from the plurality of pre-defined authentication actions, one or more commands directing the account portal computing platform (e.g., account portal computing platform 120) to allow access, conditionally allow access, or prevent access to the one or more secured information resources associated with the first user account in the first client portal session.

At step 219, client authentication computing platform 110 may send the one or more commands (e.g., to account portal computing platform 120, to set the authentication level for the requested session). For example, at step 219, client authentication computing platform 110 may send, via the communication interface (e.g., communication interface 113), to the account portal computing platform (e.g., account portal computing platform 120), the one or more commands directing the account portal computing platform (e.g., account portal computing platform 120) to allow access, conditionally allow access, or prevent access to the one or more secured information resources associated with the first user account in the first client portal session. For instance, by sending the one or more commands to account portal computing platform 120, client authentication computing platform 110 may trigger and/or otherwise causes account portal computing platform 120 to perform one or more authentication actions determined by client authentication computing platform 110 based on the behavioral profile and the deviation score. At step 220, account portal computing platform 120 may generate one or more portal user interfaces based on the commands received from client authentication computing platform 110.

Figure 2F:
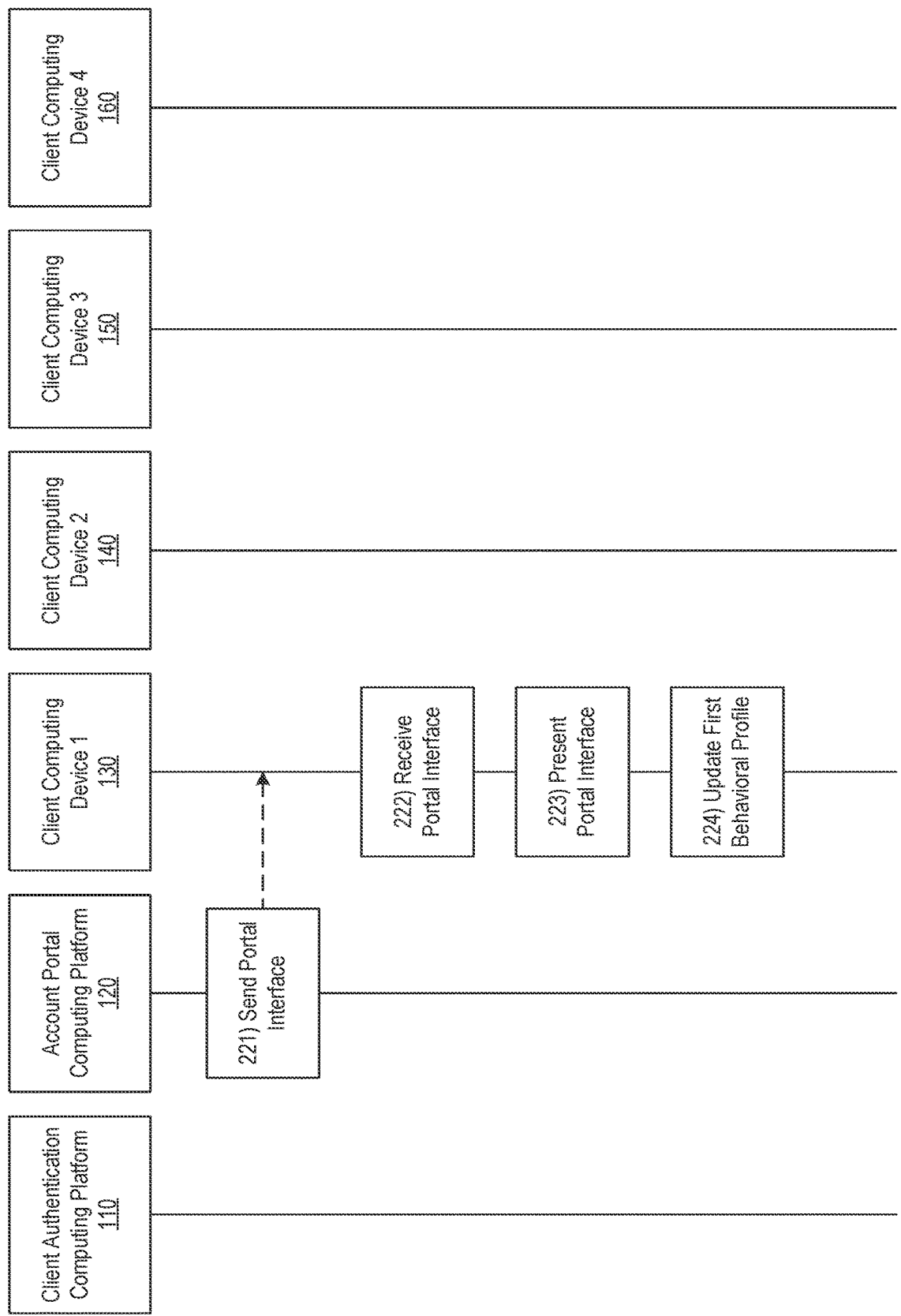
Figure 4:
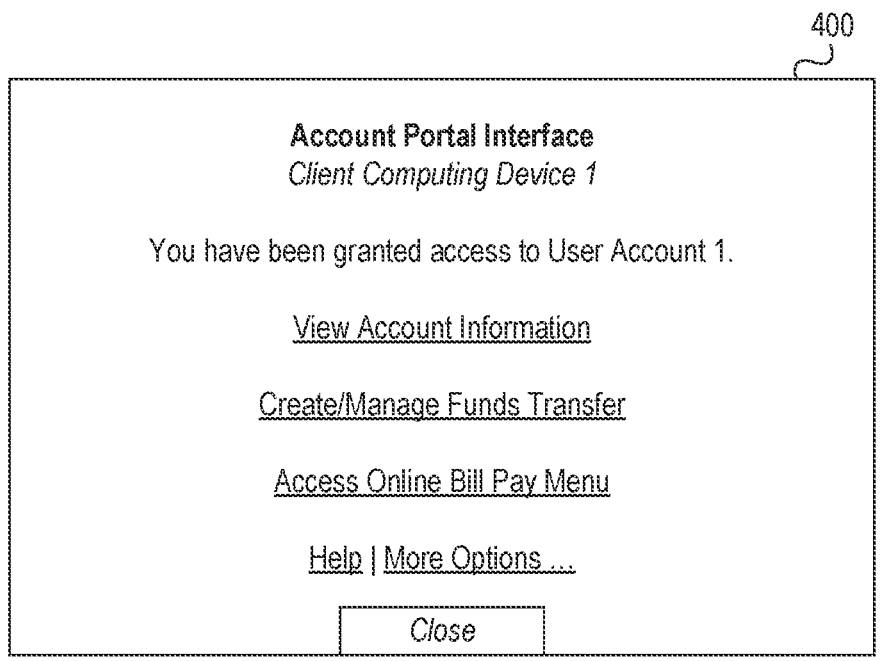
Figure 5:
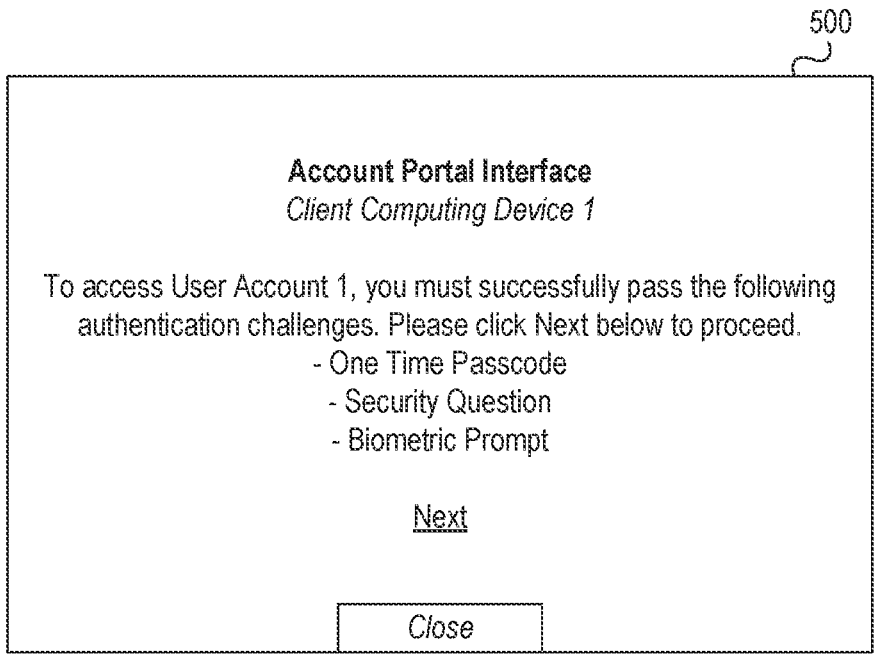
Figure 6:
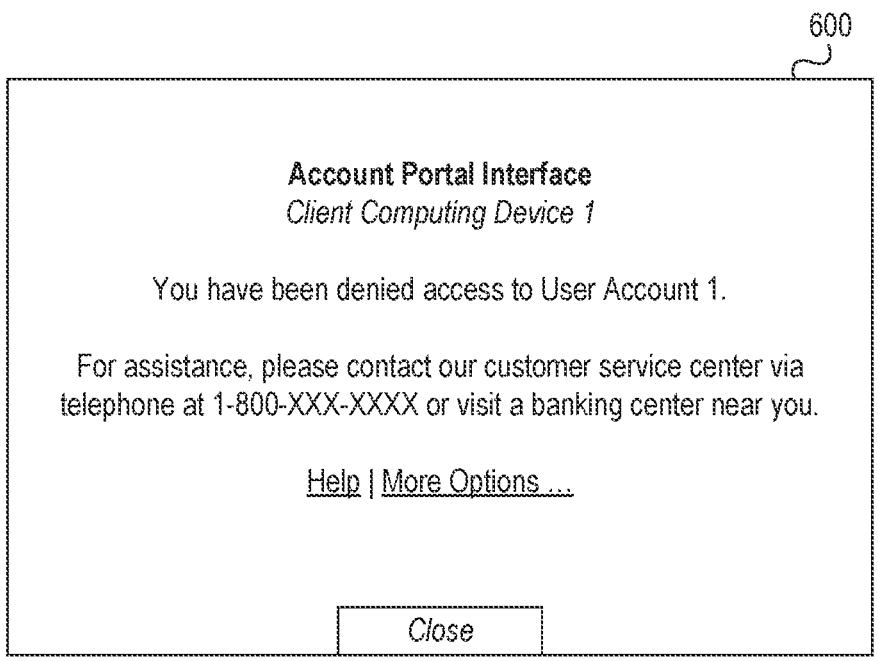

Referring to FIG. 2F, at step 221, account portal computing platform 120 may send and/or otherwise provide, to client computing device 130, the one or more portal user interfaces generated by account portal computing platform 120 based on the commands received from client authentication computing platform 110. At step 222, client computing device 130 may receive the one or more portal user interfaces from account portal computing platform 120. At step 223, client computing device 130 may display and/or otherwise present the one or more portal user interfaces received from account portal computing platform 120. For example, in displaying and/or otherwise presenting the one or more portal user interfaces received from account portal computing platform 120, client computing device 130 may display and/or otherwise present one or more graphical user interfaces similar to graphical user interface 400, which is shown in FIG. 4, graphical user interface 500, which is shown in FIG. 5, and/or graphical user interface 600, which is shown in FIG. 6. For example, as seen in FIG. 4, graphical user interface 400 may be presented (e.g., by client computing device 130) when client authentication computing platform 110 has determined to allow access to the first user account and thus may include one or more user-selectable controls and/or menus allowing a user (e.g., the user of client computing device 130) to create, view, and/or modify user account information. As seen in FIG. 5, graphical user interface 500 may be presented (e.g., by client computing device 130) when client authentication computing platform 110 has determined to conditionally allow access to the first user account and thus may include one or more challenge prompts and/or other associated information generated by client authentication computing platform 110 and/or account portal computing platform 120. As seen in FIG. 6, graphical user interface 600 may be presented (e.g., by client computing device 130) when client authentication computing platform 110 has determined to prevent access to the first user account and thus may include information indicating the authentication action determined by client authentication computing platform 110 and/or other information to assist the user.

At step 224, client authentication computing platform 110 may update the first behavioral profile (e.g., for the user account associated with client computing device 130 and/or client computing device 140, based on the information captured by client authentication computing platform 110 and/or account portal computing platform 120 in connection with the current authentication event and/or the resulting portal usage session). For example, at step 224, after sending the one or more commands directing the account portal computing platform (e.g., account portal computing platform 120) to allow access, conditionally allow access, or prevent access to the one or more secured information resources associated with the first user account in the first client portal session, client authentication computing platform 110 may update the first behavioral profile associated with the first user account based on fifth interaction data captured by the computing platform (e.g., client authentication computing platform 110) during the first client portal session.

Subsequently, client authentication computing platform 110 may similarly process one or more authentication events from the same and/or other devices involving the same and/or other user accounts by performing one or more actions similar to those described above. For example, client authentication computing platform 110 may receive, via the communication interface (e.g., communication interface 113), from the account portal computing platform (e.g., account portal computing platform 120), a second authentication request corresponding to a request for a second user of a third client computing device (e.g., client computing device 150) to access one or more secured information resources associated with a second user account in a second client portal session. Based on receiving the second authentication request from the account portal computing platform (e.g., account portal computing platform 120), client authentication computing platform 110 may capture one or more behavioral parameters associated with the third client computing device (e.g., client computing device 150). Client authentication computing platform 110 may evaluate the one or more behavioral parameters associated with the third client computing device (e.g., client computing device 150) using a second behavioral profile associated with the second user account to determine a second behavioral deviation score. Based on the second behavioral deviation score, client authentication computing platform 110 may select a second authentication action from the plurality of pre-defined authentication actions. Subsequently, client authentication computing platform 110 may generate, based on the second authentication action selected from the plurality of pre-defined authentication actions, one or more commands directing the account portal computing platform (e.g., account portal computing platform 120) to allow access, conditionally allow access, or prevent access to the one or more secured information resources associated with the second user account in the second client portal session. Then, client authentication computing platform 110 may send, via the communication interface (e.g., communication interface 113), to the account portal computing platform (e.g., account portal computing platform 120), the one or more commands directing the account portal computing platform (e.g., account portal computing platform 120) to allow access, conditionally allow access, or prevent access to the one or more secured information resources associated with the second user account in the second client portal session.

Figure 7:
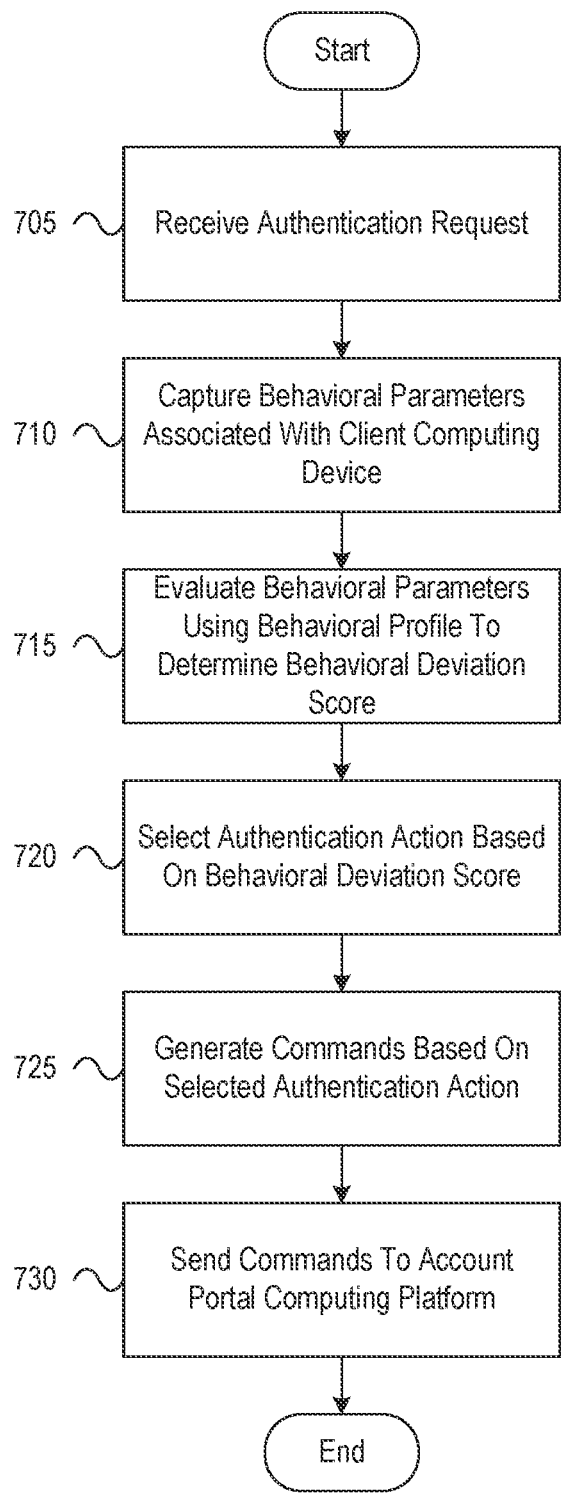
FIG. 7 depicts an illustrative method for processing authentication requests to secured information systems based on machine-learned user behavior profiles in accordance with one or more example embodiments.

FIG. 7 depicts an illustrative method for processing authentication requests to secured information systems based on machine-learned user behavior profiles in accordance with one or more example embodiments. Referring to FIG. 7, at step 705, a computing platform having at least one processor, a communication interface, and memory may receive, via the communication interface, from an account portal computing platform, a first authentication request corresponding to a request for a first user of a first client computing device to access one or more secured information resources associated with a first user account in a first client portal session. At step 710, based on receiving the first authentication request from the account portal computing platform, the computing platform may capture one or more behavioral parameters associated with the first client computing device. At step 715, the computing platform may evaluate the one or more behavioral parameters associated with the first client computing device using a first behavioral profile associated with the first user account to determine a first behavioral deviation score. At step 720, based on the first behavioral deviation score, the computing platform may select a first authentication action from a plurality of pre-defined authentication actions. At step 725, the computing platform may generate, based on the first authentication action selected from the plurality of pre-defined authentication actions, one or more commands directing the account portal computing platform to allow access, conditionally allow access, or prevent access to the one or more secured information resources associated with the first user account in the first client portal session. At step 730, the computing platform may send, via the communication interface, to the account portal computing platform, the one or more commands directing the account portal computing platform to allow access, conditionally allow access, or prevent access to the one or more secured information resources associated with the first user account in the first client portal session.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor;
a communication interface communicatively coupled to the at least one processor; and
memory storing computer-readable instructions that, when executed by the at least one processor, cause the computing platform to:
   receive, via the communication interface, from an account portal computing platform, a first authentication request corresponding to a request for a first user of a first client computing device to access one or more secured information resources associated with a first user account in a first client portal session;
   based on receiving the first authentication request from the account portal computing platform, capture one or more parameters associated with the first client computing device;
   evaluate the one or more parameters associated with the first client computing device using a first profile associated with the first user account to determine a first deviation score;
   based on the first deviation score, select a first authentication action from a plurality of pre-defined authentication actions;
   generate, based on the first authentication action selected from the plurality of pre-defined authentication actions, one or more commands directing the account portal computing platform to allow access, conditionally allow access, or prevent access to the one or more secured information resources associated with the first user account in the first client portal session; and send, via the communication interface, to the account portal computing platform, the one or more commands directing the account portal computing platform to allow access, conditionally allow access, or prevent access to the one or more secured information resources associated with the first user account in the first client portal session, wherein the memory stores additional computer-readable instructions that, when executed by the at least one processor, cause the computing platform to:
prior to receiving the first authentication request from the account portal computing platform:
capture first interaction data associated with the first user using the first client computing device to access the one or more secured information resources associated with the first user account;
log the first interaction data in a client authentication database;
capture second interaction data associated with the first user using a second client computing device to access the one or more secured information resources associated with the first user account;
log the second interaction data in the client authentication database;
build the first profile associated with the first user account based on the first interaction data and the second interaction data; and
store the first profile associated with the first user account in the client authentication database.

2. The computing platform of claim 1, wherein receiving the first authentication request from the account portal computing platform comprises receiving one or more login credentials associated with the first user account.

3. The computing platform of claim 1, wherein capturing the one or more parameters associated with the first client computing device comprises probing the first client computing device to obtain device information from the first client computing device.

4. The computing platform of claim 1, wherein capturing the one or more parameters associated with the first client computing device comprises receiving, via the communication interface, from the account portal computing platform, activity information associated with the first client computing device.

5. The computing platform of claim 1, wherein capturing the one or more parameters associated with the first client computing device comprises capturing one or more authenticators used by the first user of the first client computing device in requesting access to the one or more secured information resources associated with the first user account and capturing information identifying one or more events requested by the first user of the first client computing device.

6. The computing platform of claim 5, wherein capturing the one or more parameters associated with the first client computing device comprises capturing a device identifier associated with the first client computing device, a device location associated with the first client computing device, a network address associated with the first client computing device, an internet service provider associated with the first client computing device, a mobile or desktop indicator associated with the first client computing device, a time zone setting associated with the first client computing device, and a language setting associated with the first client computing device.

7. The computing platform of claim 1, wherein the first profile associated with the first user account used in evaluating the one or more parameters associated with the first client computing device is determined by the computing platform based on interaction data captured by the computing platform during previous interactions with the first client computing device.

8. The computing platform of claim 1, wherein evaluating the one or more parameters associated with the first client computing device using the first profile associated with the first user account to determine the first deviation score comprises summing one or more distance increments for each identified difference of one or more identified differences between the one or more parameters associated with the first client computing device and one or more historical parameters associated with the first profile associated with the first user account.

9. The computing platform of claim 1, wherein the plurality of pre-defined authentication actions comprises permitting access to a specific user account without further authentication, permitting access to the specific user account upon one or more successful responses to one or more challenge prompts generated by the computing platform, and denying access to the specific user account.

10. The computing platform of claim 1, wherein building the first profile associated with the first user account based on the first interaction data and the second interaction data comprises compiling information identifying a plurality of devices that have been used to access the first user account.

11. The computing platform of claim 10, wherein building the first profile associated with the first user account based on the first interaction data and the second interaction data further comprises compiling information indicating how many times specific devices of the plurality of devices were used to perform specific functions.

12. The computing platform of claim 1, wherein the memory stores additional computer-readable instructions that, when executed by the at least one processor, cause the computing platform to:
after sending the one or more commands directing the account portal computing platform to allow access, conditionally allow access, or prevent access to the one or more secured information resources associated with the first user account in the first client portal session, update the first profile associated with the first user account based on fifth interaction data captured by the computing platform during the first client portal session.

13. The computing platform of claim 1, wherein the memory stores additional computer-readable instructions that, when executed by the at least one processor, cause the computing platform to:
receive, via the communication interface, from the account portal computing platform, a second authentication request corresponding to a request for a second user of a third client computing device to access one or more secured information resources associated with a second user account in a second client portal session;
based on receiving the second authentication request from the account portal computing platform, capture one or more parameters associated with the third client computing device;
evaluate the one or more parameters associated with the third client computing device using a second profile associated with the second user account to determine a second deviation score;
based on the second deviation score, select a second authentication action from the plurality of pre-defined authentication actions;

generate, based on the second authentication action selected from the plurality of pre-defined authentication actions, one or more commands directing the account portal computing platform to allow access, conditionally allow access, or prevent access to the one or more secured information resources associated with the second user account in the second client portal session; and send, via the communication interface, to the account portal computing platform, the one or more commands directing the account portal computing platform to allow access, conditionally allow access, or prevent access to the one or more secured information resources associated with the second user account in the second client portal session.

14. The computing platform of claim 13, wherein the memory stores additional computer-readable instructions that, when executed by the at least one processor, cause the computing platform to:

prior to receiving the second authentication request from the account portal computing platform:

capture third interaction data associated with the second user using the third client computing device to access the one or more secured information resources associated with the second user account;

log the third interaction data in a client authentication database;

capture fourth interaction data associated with the second user using a fourth client computing device to access the one or more secured information resources associated with the second user account; and log the fourth interaction data in the client authentication database.

15. The computing platform of claim 14, wherein the memory stores additional computer-readable instructions that, when executed by the at least one processor, cause the computing platform to:

build the second profile associated with the second user account based on the third interaction data and the fourth interaction data; and store the second profile associated with the second user account in the client authentication database.

16. A method, comprising:

at a computing platform comprising at least one processor, a communication interface, and memory:

receiving, by the at least one processor, via the communication interface, from an account portal computing platform, a first authentication request corresponding to a request for a first user of a first client computing device to access one or more secured information resources associated with a first user account in a first client portal session;

based on receiving the first authentication request from the account portal computing platform, capturing, by the at least one processor, one or more parameters associated with the first client computing device;

evaluating, by the at least one processor, the one or more parameters associated with the first client computing device using a first profile associated with the first user account to determine a first deviation score;

based on the first deviation score, selecting, by the at least one processor, a first authentication action from a plurality of pre-defined authentication actions;

generating, by the at least one processor, based on the first authentication action selected from the plurality of pre-defined authentication actions, one or more commands directing the account portal computing platform to allow access, conditionally allow access, or prevent access to the one or more secured information resources associated with the first user account in the first client portal session; and sending, by the at least one processor, via the communication interface, to the account portal computing platform, the one or more commands directing the account portal computing platform to allow access, conditionally allow access, or prevent access to the one or more secured information resources associated with the first user account in the first client portal session, wherein the method further comprises:

prior to receiving the first authentication request from the account portal computing platform:

capturing, by the at least one processor, first interaction data associated with the first user using the first client computing device to access the one or more secured information resources associated with the first user account;

logging, by the at least one processor, the first interaction data in a client authentication database;

capturing, by the at least one processor, second interaction data associated with the first user using a second client computing device to access the one or more secured information resources associated with the first user account;

logging, by the at least one processor, the second interaction data in the client authentication database;

building, by the at least one processor, the first profile associated with the first user account based on the first interaction data and the second interaction data; and storing, by the at least one processor, the first profile associated with the first user account in the client authentication database.

17. The method of claim 16, wherein receiving the first authentication request from the account portal computing platform comprises receiving one or more login credentials associated with the first user account.

18. The method of claim 16, wherein capturing the one or more parameters associated with the first client computing device comprises probing the first client computing device to obtain device information from the first client computing device.

19. The method of claim 16, wherein capturing the one or more parameters associated with the first client computing device comprises receiving, via the communication interface, from the account portal computing platform, activity information associated with the first client computing device.

20. One or more non-transitory computer-readable media storing instructions that, when executed by a computing platform comprising at least one processor, a communication interface, and memory, cause the computing platform to:

receive, via the communication interface, from an account portal computing platform, a first authentication request corresponding to a request for a first user of a first client computing device to access one or more secured information resources associated with a first user account in a first client portal session;

based on receiving the first authentication request from the account portal computing platform, capture one or more parameters associated with the first client computing device;

evaluate the one or more parameters associated with the first client computing device using a first profile associated with the first user account to determine a first deviation score;

based on the first deviation score, select a first authentication action from a plurality of pre-defined authentication actions;

generate, based on the first authentication action selected from the plurality of pre-defined authentication actions, one or more commands directing the account portal computing platform to allow access, conditionally allow access, or prevent access to the one or more secured information resources associated with the first user account in the first client portal session; and send, via the communication interface, to the account portal computing platform, the one or more commands directing the account portal computing platform to allow access, conditionally allow access, or prevent access to the one or more secured information resources associated with the first user account in the first client portal session, wherein the one or more non-transitory computer-readable media store additional instructions that, when executed, cause the computing platform to:

prior to receiving the first authentication request from the account portal computing platform:

capture first interaction data associated with the first user using the first client computing device to access the one or more secured information resources associated with the first user account;

log the first interaction data in a client authentication database;

capture second interaction data associated with the first user using a second client computing device to access the one or more secured information resources associated with the first user account;

log the second interaction data in the client authentication database;

build the first profile associated with the first user account based on the first interaction data and the second interaction data; and store the first profile associated with the first user account in the client authentication database.

* * * * *